US012763843B2

(12) United States Patent
Bhat et al.

(10) Patent No.: US 12,763,843 B2
(45) **Date of Patent: *Oct. 13, 2026**

(54) PASSIVE BEAMFORMING FOR Wi-Fi

(71) Applicant: QUALCOMM Incorporated, San Diego, CA (US)

(72) Inventors: Venkatesh Bhat, Bangalore (IN); Manikandan Chandrasekar, Bangalore (IN); Raj Kumar Krishna Kumar, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 60 days.

This patent is subject to a terminal disclaimer.

(21) Appl. No.: 18/927,585

(22) Filed: Oct. 25, 2024

(65) Prior Publication Data

US 2025/0047364 A1 Feb. 6, 2025

Related U.S. Application Data

(63) Continuation of application No. 18/159,640, filed on Jan. 25, 2023, now Pat. No. 12,132,559.

(51) Int. Cl.
*H04B 7/145* (2006.01)
*H04W 76/27* (2018.01)

(52) U.S. Cl.
CPC ............ *H04B 7/145* (2013.01); *H04W 76/27* (2018.02)

(58) Field of Classification Search
CPC ............................... H04B 7/145; H04W 76/02
See application file for complete search history.

(56) References Cited

U.S. PATENT DOCUMENTS

| | | | | |
|---|---|---|---|---|
| 11,659,518 B2 * | 5/2023 | Sakhnini | .............. | H04B 7/0408 370/329 |
| 12,132,559 B2 * | 10/2024 | Bhat | ..................... | H04W 76/27 |
| 2020/0382173 A1 * | 12/2020 | Park | ...................... | H04W 28/06 |
| 2024/0250744 A1 | 7/2024 | Bhat | | |
| 2025/0047364 A1 * | 2/2025 | Bhat | ...................... | H04B 7/145 |

FOREIGN PATENT DOCUMENTS

| | | |
|---|---|---|
| EP | 3833151 A1 | 6/2021 |
| WO | 2018165529 A1 | 9/2018 |

* cited by examiner

*Primary Examiner* — Jaison Joseph
(74) *Attorney, Agent, or Firm* — Holland & Hart LLP

(57) ABSTRACT

Methods, systems, and devices for wireless communications are described. Techniques described herein provide for passive beamforming for Wi-Fi. A first wireless device communicating in an active session via a first bandwidth with a second wireless device may use a passive beamforming technique to identify a transmission sector of the second wireless device and/or a receive sector for communications on a second bandwidth, while the first wireless device is in an inactive session state for the second bandwidth. The second wireless device may transmit beacons in the second bandwidth via directional transmission sectors while the first wireless device is in the inactive session state for the second bandwidth. The first wireless device may receive the beacons and may select a transmission sector based on the beacons. The first wireless device may indicate the selected transmission sector to the second wireless device. The first wireless device may select a receive sector based on the beacons.

20 Claims, 17 Drawing Sheets

PASSIVE BEAMFORMING FOR Wi-Fi

CROSS REFERENCE

The present application for patent is a continuation of U.S. patent application Ser. No. 18/159,640 by BHAT et al., entitled "PASSIVE BEAMFORMING FOR WI-FI," filed Jan. 25, 2023, assigned to the assignee hereof, and is expressly incorporated by reference in its entirety herein.

BACKGROUND

The following relates to wireless communications, including passive beamforming for Wi-Fi.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a wireless fidelity (Wi-Fi) (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the STA to the AP.

SUMMARY

The described techniques relate to improved methods, systems, devices, or apparatuses that support passive beamforming for Wi-Fi. A station (STA) may use a passive beamforming technique to identify access point (AP) transmission (Tx) and receive (Rx) sectors and/or a STA Tx and Rx sectors for communications on a millimeter wave (mmWave) frequency band, such as 60 gigahertz (GHz) band, 28 GHz band or 45 GHz band. While the AP and STA are active on a lower frequency band (e.g., a 2.4 GHz band, a 5 GHz band, or a 6 GHz band), the AP may transmit beacons in 60 GHz or other mmWave frequency band from directional Tx sectors. The STA may receive the beacons and may identify the Tx sector for the AP based on signal measurements at the STA. The STA may tune each Rx sector to receive beacons from the selected Tx sector and may identify the STA Rx sector based on signal measurements for the beacons from the selected Tx sector. The STA may transmit information indicating the selected Tx sector to the AP. Accordingly, for future communications via the 60 GHz band or other mmWave frequency band, the STA and the AP may use the selected Tx sector and the selected Rx sector.

A method for wireless communications at a first wireless device is described. The method may include communicating, with an second wireless device, one or more messages via a first session established between the first wireless device and the second wireless device via a first bandwidth, the first wireless device being in an inactive session state for a second bandwidth on which communication is supported by the second wireless device, receiving, from the second wireless device via the second bandwidth while operating in the inactive session state, a set of multiple beacons corresponding to a set of multiple transmission sectors of the second wireless device for the second bandwidth, and transmitting, to the second wireless device, information indicating a selected transmission sector for the second bandwidth based on measurement information of the set of multiple beacons.

An apparatus for wireless communications at a first wireless device is described. The apparatus may include a processor, memory coupled with the processor, and instructions stored in the memory. The instructions may be executable by the processor to cause the apparatus to communicating, with an second wireless device, one or more messages via a first session establish between the first wireless device and the second wireless device via a first bandwidth, the first wireless device being in an inactive session state for a second bandwidth on which communication is supported by the second wireless device, receive, from the second wireless device via the second bandwidth while operating in the inactive session state, a set of multiple beacons corresponding to a set of multiple transmission sectors of the second wireless device for the second bandwidth, and transmit, to the second wireless device, information indicating a selected transmission sector for the second bandwidth based on measurement information of the set of multiple beacons.

Another apparatus for wireless communications at a first wireless device is described. The apparatus may include means for communicating, with an second wireless device, one or more messages via a first session established between the first wireless device and the second wireless device via a first bandwidth, the first wireless device being in an inactive session state for a second bandwidth on which communication is supported by the second wireless device, means for receiving, from the second wireless device via the second bandwidth while operating in the inactive session state, a set of multiple beacons corresponding to a set of multiple transmission sectors of the second wireless device for the second bandwidth, and means for transmitting, to the second wireless device, information indicating a selected transmission sector for the second bandwidth based on measurement information of the set of multiple beacons.

A non-transitory computer-readable medium storing code for wireless communications at a first wireless device is described. The code may include instructions executable by a processor to communicating, with an second wireless device, one or more messages via a first session establish between the first wireless device and the second wireless device via a first bandwidth, the first wireless device being in an inactive session state for a second bandwidth on which communication is supported by the second wireless device, receive, from the second wireless device via the second bandwidth while operating in the inactive session state, a set of multiple beacons corresponding to a set of multiple transmission sectors of the second wireless device for the second bandwidth, and transmit, to the second wireless device, information indicating a selected transmission sector for the second bandwidth based on measurement information of the set of multiple beacons.

Some examples of the method, apparatuses, and non-transitory computer-readable medium described herein may further include operations, features, means, or instructions for receiving a message from the second wireless device via the second bandwidth via the selected transmission sector.

Some examples of the method, apparatuses, and non-transitory computer-readable medium described herein may further include operations, features, means, or instructions for determining a selected receive sector for the first wireless device for the second bandwidth from a set of multiple receive sectors based on the set of multiple beacons; and receiving a message from the second wireless device via the second bandwidth using the selected receive sector.

Some examples of the method, apparatuses, and non-transitory computer-readable medium described herein may further include operations, features, means, or instructions for transmitting a second message to the second wireless device via the second bandwidth using a transmission sector for the first wireless device that corresponds to the selected receive sector.

In some examples of the method, apparatuses, and non-transitory computer-readable medium described herein, transmitting the information may include operations, features, means, or instructions for transmitting the information via the second bandwidth.

In some examples of the method, apparatuses, and non-transitory computer-readable medium described herein, transmitting the information may include operations, features, means, or instructions for transmitting the information via the first bandwidth.

In some examples of the method, apparatuses, and non-transitory computer-readable medium described herein, each beacon of the set of multiple beacons includes a respective marker identifying a corresponding transmission sector.

Some examples of the method, apparatuses, and non-transitory computer-readable medium described herein may further include operations, features, means, or instructions for receiving, from the second wireless device, scheduling information for the set of multiple beacons, where receiving the set of multiple beacons may be based on monitoring for the set of multiple beacons in accordance with the scheduling information.

In some examples of the method, apparatuses, and non-transitory computer-readable medium described herein, the scheduling information indicates a refrain from data communications for the first wireless device on the first bandwidth during a time period corresponding to the set of multiple beacons.

In some examples of the method, apparatuses, and non-transitory computer-readable medium described herein, the first bandwidth includes a sub-6 GHz bandwidth.

In some examples of the method, apparatuses, and non-transitory computer-readable medium described herein, the second bandwidth includes a 60 GHz bandwidth.

In some examples of the method, apparatuses, and non-transitory computer-readable medium described herein, the second wireless device includes an AP.

Some examples of the method, apparatuses, and non-transitory computer-readable medium described herein may further include operations, features, means, or instructions for transmitting, to the second wireless device, an indication that the first wireless device will perform a passive beamforming procedure using the set of multiple beacons.

Some examples of the method, apparatuses, and non-transitory computer-readable medium described herein may further include operations, features, means, or instructions for receive, from second wireless device, an indication to perform a passive beamforming procedure using the set of multiple beacons, where reception of the set of multiple beacons may be based on the indication.

A method for wireless communications at a second wireless device is described. The method may include communicating, with a first wireless device, one or more messages via a first session established between the first wireless device and the second wireless device via a first bandwidth, the first wireless device being in an inactive session state for a second bandwidth on which communication is supported by the second wireless device, transmitting, via the second bandwidth while the first wireless device is in the inactive session state, a set of multiple beacons corresponding to a set of multiple transmission sectors of the second wireless device, and receiving, from the first wireless device, information indicating a selected transmission sector for the second bandwidth.

An apparatus for wireless communications at a second wireless device is described. The apparatus may include a processor, memory coupled with the processor, and instructions stored in the memory. The instructions may be executable by the processor to cause the apparatus to communicating, with a first wireless device, one or more messages via a first session establish between the first wireless device and the second wireless device via a first bandwidth, the first wireless device being in an inactive session state for a second bandwidth on which communication is supported by the second wireless device, transmit, via the second bandwidth while the first wireless device is in the inactive session state, a set of multiple beacons corresponding to a set of multiple transmission sectors of the second wireless device, and receive, from the first wireless device, information indicating a selected transmission sector for the second bandwidth.

Another apparatus for wireless communications at a second wireless device is described. The apparatus may include means for communicating, with a first wireless device, one or more messages via a first session established between the first wireless device and the second wireless device via a first bandwidth, the first wireless device being in an inactive session state for a second bandwidth on which communication is supported by the second wireless device, means for transmitting, via the second bandwidth while the first wireless device is in the inactive session state, a set of multiple beacons corresponding to a set of multiple transmission sectors of the second wireless device, and means for receiving, from the first wireless device, information indicating a selected transmission sector for the second bandwidth.

A non-transitory computer-readable medium storing code for wireless communications at a second wireless device is described. The code may include instructions executable by a processor to communicating, with a first wireless device, one or more messages via a first session establish between the first wireless device and the second wireless device via a first bandwidth, the first wireless device being in an inactive session state for a second bandwidth on which communication is supported by the second wireless device, transmit, via the second bandwidth while the first wireless device is in the inactive session state, a set of multiple beacons corresponding to a set of multiple transmission sectors of the second wireless device, and receive, from the first wireless device, information indicating a selected transmission sector for the second bandwidth.

Some examples of the method, apparatuses, and non-transitory computer-readable medium described herein may further include operations, features, means, or instructions for transmitting, to the first wireless device, a message via the second bandwidth via the selected transmission sector.

In some examples of the method, apparatuses, and non-transitory computer-readable medium described herein, each beacon of the set of multiple beacons includes a respective marker identifying a corresponding transmission sector.

Some examples of the method, apparatuses, and non-transitory computer-readable medium described herein may further include operations, features, means, or instructions for transmitting, to the first wireless device, scheduling information for the set of multiple beacons, where receiving the set of multiple beacons may be based on monitoring for the set of multiple beacons in accordance with the scheduling information.

In some examples of the method, apparatuses, and non-transitory computer-readable medium described herein, the scheduling information indicates a refrain from data communications for the first wireless device on the first bandwidth during a time period corresponding to the set of multiple beacons.

In some examples of the method, apparatuses, and non-transitory computer-readable medium described herein, the first bandwidth includes a sub-6 GHz bandwidth.

In some examples of the method, apparatuses, and non-transitory computer-readable medium described herein, the second bandwidth includes a 60 GHz bandwidth.

In some examples of the method, apparatuses, and non-transitory computer-readable medium described herein, receiving the information may include operations, features, means, or instructions for receiving the information via the second bandwidth.

In some examples of the method, apparatuses, and non-transitory computer-readable medium described herein, receiving the information may include operations, features, means, or instructions for receiving the information via the first bandwidth.

In some examples of the method, apparatuses, and non-transitory computer-readable medium described herein, the second wireless device includes an AP.

Some examples of the method, apparatuses, and non-transitory computer-readable medium described herein may further include operations, features, means, or instructions for refraining from transmitting data transmissions via the first bandwidth during a beacon interval corresponding to transmission of the set of multiple beacons.

Some examples of the method, apparatuses, and non-transitory computer-readable medium described herein may further include operations, features, means, or instructions for receiving, from the first wireless device, an indication that the first wireless device will perform a passive beamforming procedure using the set of multiple beacons and refraining from transmitting data communications to the first wireless device during a time period corresponding to the set of multiple beacons based on the indication.

Some examples of the method, apparatuses, and non-transitory computer-readable medium described herein may further include operations, features, means, or instructions for transmitting, to the second wireless device, an indication to perform a passive beamforming procedure using the set of multiple beacons.

DETAILED DESCRIPTION

Figure 1:
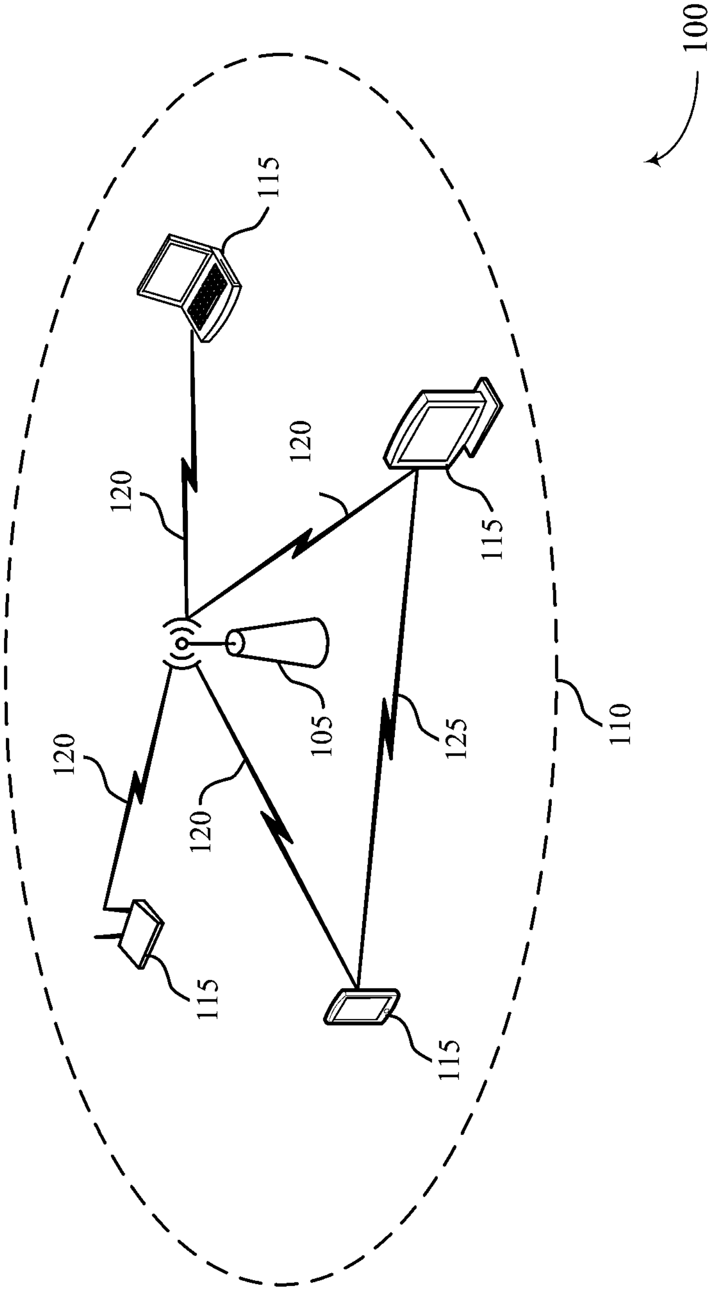
FIG. 1 illustrates an example of a wireless local area network (WLAN) that supports passive beamforming for wi-fi in accordance with aspects of the present disclosure.

In some wireless communications systems, wireless devices (such as wireless fidelity (Wi-Fi) devices) may communicate via multiple different frequency bands. For example, an access point (AP) and a station (STA) may communicate via a 2.4 gigahertz (GHz) band, a 5 GHz band, a 6 GHz band, or any combination thereof, which may generally be referred to as "sub-6" GHz bands. In some systems, the AP and STA may be capable of communication via a 60 GHz band or other millimeter wave (mmWave) frequency band, which may provide relatively higher data rates or greater link diversity. For the present description, 60 GHz band is one example of a mmWave frequency band, and other mmWave frequency bands, such as 28 GHz and 45 GHz may be used.

Communication over the 60 GHz band may present several challenges, which may hinder its adoption (which may, in turn, limit an achievable throughput or diversity of a system). For example, the 60 GHz band may be relatively more susceptible to propagation losses as compared to sub-6 bands. However, unlike operation in sub-6 GHz bands (e.g., 2.4/5/6 GHz), operation in the 60 GHz band may require directional transmission (e.g., beamforming). Periodic beamforming on the 60 GHz band may be required for maintaining a 60 GHz link between the AP and the STA while a session is active on a sub-6 band. Periodic beamforming may increase power consumption and computational overhead, and may add delays. Periodic beamforming may also result in communications outage on a STA that is not capable of Dual Band Simultaneous (DBS) operation (e.g., simultaneous communications on the sub-6 GHz band and the 60 GHz band).

When a first wireless device (e.g., a non-DBS multi-band STA) is communicating in an active session via a first bandwidth (e.g., a sub-6 GHz band) with a second wireless device (e.g., an AP or a DBS STA), and while the first wireless device is in an inactive session state for a second bandwidth (e.g., a 60 GHz band), the first wireless device may use a passive beamforming procedure to identify a transmission (Tx) sector and/or a receive (Rx) sector for communications in the second bandwidth. During the active session state, uplink and downlink communication may be scheduled and communicated between the first and second wireless devices. During the inactive session state, uplink and downlink communication may not be scheduled nor communicated between the first and second wireless devices.

In an example, the second wireless device may transmit, via the second bandwidth, while the first wireless device and the second wireless device are communicating in an active session in the first bandwidth and while the first wireless device is in an inactive session state in the second bandwidth, a number of beacons that correspond to a number of transmission sectors for the second wireless device. The first wireless device may transmit, to the second wireless device, an indication of a selected transmission sector for the second bandwidth. Accordingly, for future communications via the second bandwidth (e.g., once the first wireless device transitions from an inactive session state to an active session state for the second bandwidth), the second wireless device may use the indicated transmission sector without performing additional beam training procedures, thereby avoiding time and power consumption used for periodic beamforming on the second bandwidth as well as time delays and communications outages.

For example, while the first wireless device and the second wireless device are in an active session state on a 2.4 GHz band, a 5 GHz band or a 6 GHz band and the first wireless is in inactive session state on the 60 GHz band, the second wireless device may transmit beacons in the 60 GHz band from directional Tx sectors in accordance with a Target Beacon Transmission Time (TBTT), which may be indicated via control signaling to the first wireless device. The second wireless device may deliver a beacon to every Tx sector at least once every "MaxLostBeacons" beacon interval. The "MaxLostBeacons" beacon interval may be indicated to the first wireless device, for example via medium access control (MAC) signaling. Each beacon may include unique markers per transmit sector and antenna. In some examples, the first wireless device may receive the beacons and may identify the selected Tx sector based on signal measurements at the first wireless device. In some examples, the first wireless device may transmit information indicating the selected Tx sector to the second wireless device via the active sub-6 band. In some examples, the first wireless device may transmit information indicating the selected Tx sector to the second wireless device via the 60 GHz band. The selected Tx sector may be identified without periodic beamforming on the 60 GHz band, thereby avoiding time and power consumption used for periodic beamforming on the 60 GHz band as well as time delays and communications outages.

In some examples, the first wireless device may also identify an Rx sector for communications via the second bandwidth (e.g., via the 60 GHz band) based on beacons transmitted via the second bandwidth. To identify the Rx sector for communications in the second bandwidth, the first wireless device may tune each Rx sector for "MaxLostBeacons" beacon intervals to receive beacons from the selected Tx sector at each Rx sector. The first wireless device may select an Rx sector based on signal measurements for the beacons from selected Tx sector. For future communications via the 60 GHz band, the first wireless device may use the selected Rx sector. Accordingly, the first wireless device may select an Rx sector without periodic beamforming on the second bandwidth (e.g., the 60 GHz band when the first wireless device is in an inactive state for the 60 GHz band), thereby avoiding time, power and computation consumption used for periodic beamforming on the inactive second bandwidth. Identifying a Rx sector based on beacons transmitted by the second wireless device outage duration on the first bandwidth (e.g., for beamforming training for the second bandwidth) and allows faster switching from the first bandwidth to the second bandwidth.

Aspects of the disclosure are initially described in the context of a wireless local area network (WLAN). Additional aspects of the disclosure are described in the context of wireless communications system, an example beam training procedure, an example beacon transmission procedure, an example passive beamforming procedure and an example process flow. Aspects of the disclosure are further illustrated by and described with reference to apparatus diagrams, system diagrams, and flowcharts that relate to passive beamforming for Wi-Fi.

FIG. 1 illustrates a WLAN 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., carrier-sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of an request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some examples, wireless devices (such as Wi-Fi devices) may communicate via multiple different frequency bands. Wireless devices may include APs and STAs. For example, an AP 105 and a STA 115 may communicate via a sub-6 band. In some systems, the AP 105 and STA 115 may be capable of communication via a 60 GHz band, which may provide relatively higher data rates or greater link diversity.

When a first wireless device (e.g., a non-DBS multi-band STA 115) is communicating in an active session via a first bandwidth (e.g., a sub-6 GHz band) with a second wireless device (e.g., an AP 105 or a DBS STA 115), and while the first wireless device is in an inactive session state for a second bandwidth (e.g., a 60 GHz band), the first wireless device may use a passive beamforming procedure to identify a Tx sector and/or a Rx sector for communications in the second bandwidth. For example, the second wireless device may transmit, via the second bandwidth, while the first wireless device and the second wireless device are communicating in an active session in the first bandwidth and while the first wireless device is in an inactive session state in the second bandwidth, a number of beacons that correspond to a number of transmission sectors for the second wireless device. The first wireless device may transmit, to the second wireless device, an indication of a selected transmission sector for the second bandwidth. Accordingly, for future communications via the second bandwidth (e.g., once the first wireless device enters an active session state for the second bandwidth), the second wireless device may use the indicated transmission sector without performing additional beam training procedures, thereby avoiding time and power consumption used for periodic beamforming on the second bandwidth as well as time delays and communications outages.

For example, while the first wireless device and the second wireless device are in an active session state on a sub-6 and the first wireless is in inactive session state on the 60 GHz band, the second wireless device may transmit beacons in the 60 GHz band from directional Tx sectors in accordance with a TBTT. The second wireless device may deliver a beacon to every Tx sector at least once every "MaxLostBeacons" beacon interval. The "MaxLostBeacons" beacon interval may be indicated to the first wireless device, for example via MAC signaling. Each beacon may include unique markers per transmit sector and antenna. In some examples, the first wireless device may receive the beacons and may identify the selected Tx sector based on signal measurements at the first wireless device. In some examples, the first wireless device may transmit information indicating the selected Tx sector to the second wireless device via the active sub-6 band. In some examples, the first wireless device may transmit information indicating the selected Tx sector to the second wireless device via the 60 GHz band. The selected Tx sector may be identified without periodic beamforming on the 60 GHz band, thereby avoiding time and power consumption used for periodic beamforming on the 60 GHz band as well as time delays and communications outages.

In some examples, the first wireless device may also identify an Rx sector for communications via the second bandwidth (e.g., via the 60 GHz) band based on beacons transmitted via the second bandwidth. To identify the Rx sector for communications in the second bandwidth, the first wireless device may tune each Rx sector for "MaxLostBeacons" beacon intervals to receive beacons from the selected Tx sector at each Rx sector. The first wireless device may select an Rx sector based on signal measurements for the beacons from selected Tx sector. For future communications via the 60 GHz band, the first wireless device may use the selected Rx sector. Accordingly, the first wireless device may select an Rx sector without periodic beamforming on the second bandwidth (e.g., the 60 GHz band when the first wireless device is in an inactive state for the 60 GHz band), thereby avoiding time, power and computation consumption used for periodic beamforming on the inactive second bandwidth. Identifying a Rx sector based on beacons transmitted by the second wireless device outage duration on the first bandwidth (e.g., for beamforming training for the second bandwidth) and allows faster switching from the first bandwidth to the second bandwidth.

Figure 2:
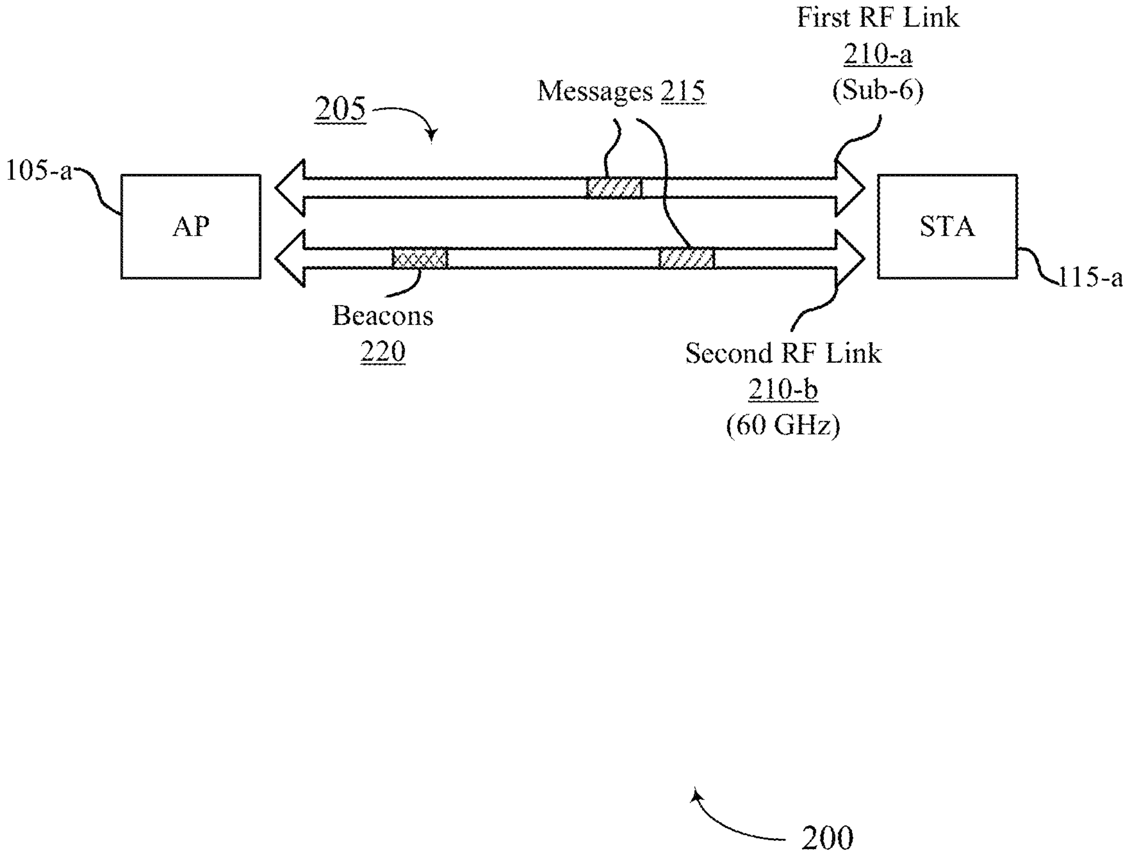
FIG. 2 illustrates an example of a wireless communications system that supports passive beamforming for Wi-Fi in accordance with one or more aspects of the present disclosure.

FIG. 2 illustrates an example of a wireless communications system 200 that supports passive beamforming for Wi-Fi in accordance with one or more aspects of the present disclosure. Aspects of the wireless communications system 200 may implement, or be implemented by, aspects of the WLAN 100. For example, the wireless communications system 200 illustrates communication between an AP 105-*a* and a STA 115-*a*, which may be examples of the AP 105 and STA 115, respectively, as described herein.

The AP 105-*a* and the STA 115-*a* may communicate via multiple different frequency bands (e.g., via a sub-6 band and a 60 GHz band). For example, the AP 105-*a* and the STA 115-*a* may communicate via a communication link 205. The communication link 205 may include one or more different links. For example, the communication link 205 may include a first radio frequency link 210-*a* and a second radio frequency link 210-*b*. In some examples, the first radio frequency link 210-*a* may be a sub-6 band such as any one or more of a 2.4 GHz band, a 5 GHz band, or a 6 GHz band, and the second radio frequency link 210-*b* may be a 60 GHz band. The AP 105-*a* and the STA 115-*a* may transmit and receive messages 215 over the first radio frequency link 210-*a* and the second radio frequency link 210-*b*. In some examples, the AP 105-*a* (or non-AP STA) may transmit beacons 220 to the STA 115-*a* over the second radio frequency link 210-*b*. In some examples, the STA 115-*a* may be in an active session state with the AP 105-*a* via the first radio frequency link 210-*a*. The STA 115-*a* may perform out of band discovery of the 60 GHz AP 105-*a* using a reduced neighbor report element or similar techniques. In some examples, the STA 115 and AP 105 may support multi-link operation (MLO) according to which the devices may communicate via the first radio frequency link 210-*a* and the second radio frequency link 210-*b*. In some examples, the STA 115 and AP 105 may perform a session transfer from the first radio frequency link 210-*a* to the second radio frequency link 210-*b* using MLO or fast session transfer (FST).

The sub-6 bands may provide limited spectrum availability. In some examples, congestion in the sub-6 bands may adversely affect tail latency and throughput. The 60 GHz band may provide a large amount of communication resources (such as a large swath of spectrum) that communicating devices (such as wireless Wi-Fi devices) may use. The additional spectrum in 60 GHz band may reduce interference due to directionality and oxygen absorption.

Operation on relatively higher radio frequency bands (such as the 60 GHz band) may present several challenges at a device or system level. For example, transmissions on the 60 GHz band may suffer from high propagation loss (e.g., high attenuation). As such, omnidirectional transmissions (e.g., non-beamformed transmissions) will not travel far. As a result, wireless devices may be required to perform directional transmissions to form a narrow beam towards the intended peer device. Stated differently, wireless devices communicating within the 60 GHz band may be required to focus transmissions and receptions to narrow beams in order for the transmissions to reach the intended receivers. Beam training procedures may be performed to identify narrow beams used to perform beamforming communications.

Figure 3:
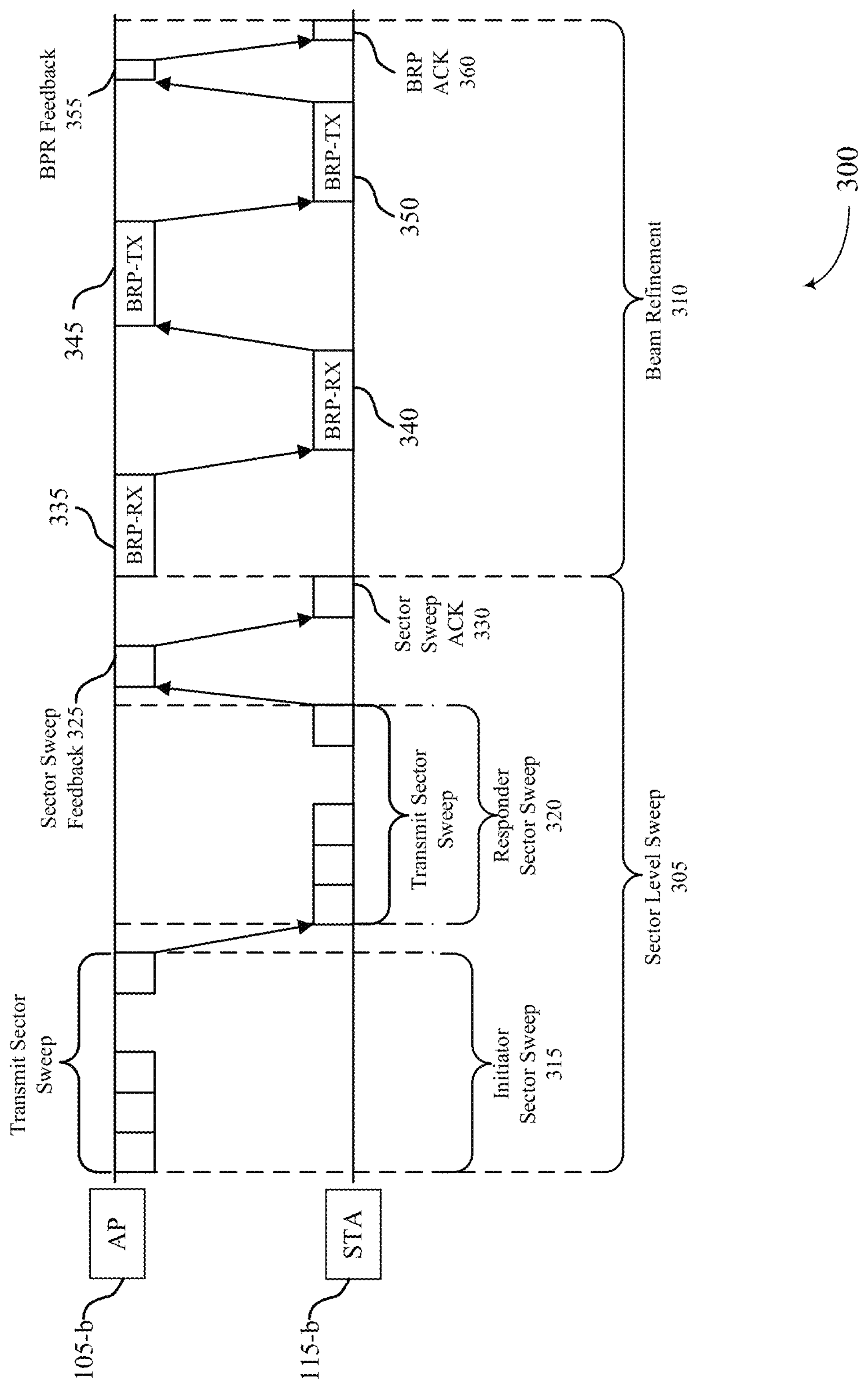
FIG. 3 illustrates an example of a beam training procedure that supports passive beamforming for Wi-Fi in accordance with one or more aspects of the present disclosure.

FIG. 3 illustrates an example of a beam training procedure 300 that supports passive beamforming for Wi-Fi in accordance with one or more aspects of the present disclosure. Aspects of the beam training procedure 300 may implement, or be implemented by, aspects of the WLAN 100 and the wireless communications system 200. For example, the beam training procedure 300 illustrates communication between an AP 105-*b* and a STA 115-*b*, which may be examples of the AP 105 and STA 115, respectively, as described herein.

During a beam training procedure, transmission/reception planes or antennas at transmitting/receiving devices may be divided up into several sectors, where the wireless devices are configured to identify narrow transmission and receive beams within a sector that will be used for beamformed communications. Some beam training procedures (e.g., beam training procedures defined by 802.11ad/ay) may include two steps or phases: (1) a sector-level sweep (SLS) phase 305, and (2) a beam refinement phase (BRP) 310.

During the SLS phase 305 of the beam training procedure 300, the wireless devices sweep across sectors (e.g., quasi-omnidirectional beams) to determine a general direction of a peer device, and identify wide beams that may be used to communicate with the peer device (e.g., identify a sector corresponding to the peer device). In other words, during SLS, each wireless device (e.g., AP 105-*b* and STA 115-*b*) may transmit a short frame on each sector at the respective device, while the other side listens in a quasi-omnidirectional or omnidirectional mode to help establish a general direction of where the peer wireless device is located.

In some examples, the SLS phase 305 includes an initiator sector sweep 315, a responder sector sweep 320, a sector sweep feedback 325 and a sector sweep acknowledgment 330. As illustrated, the AP 105-*b* is the initiator and STA 115-*b* is the responder; however, in some examples, the STA 115-*b* may be the initiator and the AP 105-*b* may be the responder. For the initiator sector sweep 315, the initiator may perform a transmit sector sweep over all sectors. The initiator may transmit a short frame with the unique marker per sector and antenna on each sector. In the initiator sector sweep 315, the responder, in quasi-omni mode, may receive the transmitted frames and may identify a selected Tx sector for the initiator based on signal measurements, such as received signal strength indicator (RSSI) at the responder. In some examples, the responder may identify the selected Tx sector for the initiator as the Tx sector associated with the highest signal strength measurement at the responder.

For the responder sector sweep 320, the responder may perform a transmit sector sweeps over all sectors. The responder may transmit a short frame with the unique marker per sector and antenna on each sector. The responder may also transmit feedback to the initiator indicating the selected Tx sector for the initiator. In the responder sector sweep 320, the initiator, in quasi-omni mode, may receive the transmitted frames and may identify a selected Tx sector for the responder based on signal measurements at the initiator. In some examples, the initiator may identify the selected Tx sector for the responder as the Tx sector associated with the highest signal strength measurement at the initiator.

For the sector sweep feedback 325, the initiator may transmit on the selected Tx sector for the initiator to provide feedback to the responder on the selected Tx sector for the responder. The responder, in quasi-omni mode, may receive the selected Tx sector for the responder. For the sector sweep acknowledgment 330, the responder may transmit on the selected Tx sector for the responder to provide acknowledgment to the initiator. The initiator may tune its Rx sector to the selected Tx sector for the initiator assuming Tx/Rx reciprocity and receives the acknowledgment from the responder. In some examples, the initiator may set its Rx sector in omni or quasi-omni mode while receiving the Tx sector acknowledgment from the responder. At the end of the SLS phase 305, the communication link may be maintained at a base modulation and coding scheme (MCS).

During the BRP 310 of the beam training procedure 300, the wireless devices sweep across narrow beams (e.g., beams that are narrower than the wide beams used in SLS) within the selected sectors found during the SLS phase 305, and identify narrow beams within the selected sectors that will be used to communicate with the peer device. In other words, the BRP 310 may follow the SLS to further refine the beam information that will be used for wireless communications. Additionally, or alternatively, BRP may be run independently (e.g., without) the SLS phase 305 to establish a narrow beam directed to a peer device. In some examples, the BRP 310 includes an initiator BRP receive sector sweep 335, a responder BRP receive sector sweep 340, an initiator BRP transmit sector sweep 345, a responder BRP transmit sector sweep 350, a BRP feedback 355 and a BRP acknowledgment 360. In some examples, the BRP may be used for Rx sector training and further refinement of antenna weight vector (AWV).

The beam training procedure 300, including the SLS phase 305, may be complex, time consuming, and result in large control signaling overhead. In some examples, full periodic beamforming on the 60 GHz band while a session between the AP 105-*b* and STA 115-*b* is active on sub-6 band may have power impact and computational overhead. Full periodic beamforming on the 60 GHz band while a session between the AP 105-*b* and STA 115-*b* is active on sub-6 band may cause prolonged outage on sub-6 band for the STA 115-*b* that is incapable of DBS operation. Additionally, full beamforming during session transfer to the 60 GHz band may cause additional delays.

Figure 4:
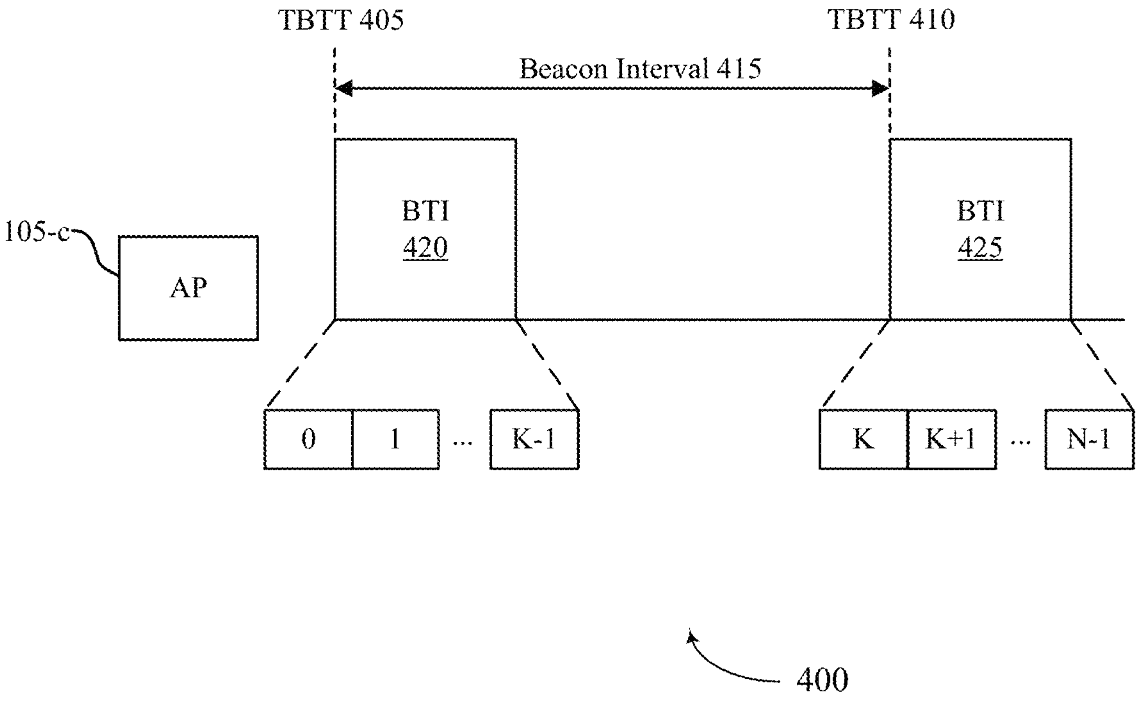
FIG. 4 illustrates an example of a beacon transmitting procedure that supports passive beamforming for Wi-Fi in accordance with one or more aspects of the present disclosure.

FIG. 4 illustrates an example of a beacon transmitting procedure 400 that supports passive beamforming for Wi-Fi in accordance with one or more aspects of the present disclosure. Aspects of the beacon transmitting procedure 400 may implement, or be implemented by, aspects of the WLAN 100 and the wireless communications system 200. For example, the beacon transmitting procedure 400 includes an AP 105-*c*, which may be an example of the AP 105 as described herein. In some examples, the beacon transmitting procedure 400 may be performed by a non-AP STA, such as a Wi-Fi-Direct device, that may be capable of transmitting beacons.

The AP 105-*c* may directionally transmit beacons in the 60 GHz band. The AP 105-*c* may sweep across multiple directional Tx sectors within the beacon interval 415 and may transmit beacons from a subset of Tx sectors every beacon internal (e.g., every TBTT). The AP 105-*c* may deliver a beacon to every Tx sector at least once every "MaxLostBeacons" beacon interval. Each beacon may include unique markers per transmit sector. In the illustrated example, between the TBTT 405 and the TBTT 410 (e.g., providing the beacon interval 415), the AP 105-*c* may transmit beacons via the Tx sectors. At the TBTT 405, the AP 105-*c* may sweep a subset of Tx sectors for a beacon transmission interval (BTI) 420 that includes multiple beacon frames (0, 1, . . . K−1). At the TBTT 410, the AP 105-*c* may sweep another subset of sectors for a BTI 425 that includes multiple beacon frames (K, K+1, . . . N−1; where N=>total quantity of sectors). As described herein, a non-DBS STA 115 may leverage the beacons in lieu of an initiator sector sweep 315 of the beam training procedure 300 for initial beamforming. Remaining phases of beamforming may be completed during dedicated association beamforming training (ABFT), contention based access period (CBAP), and service period (SP) periods.

Figure 5:
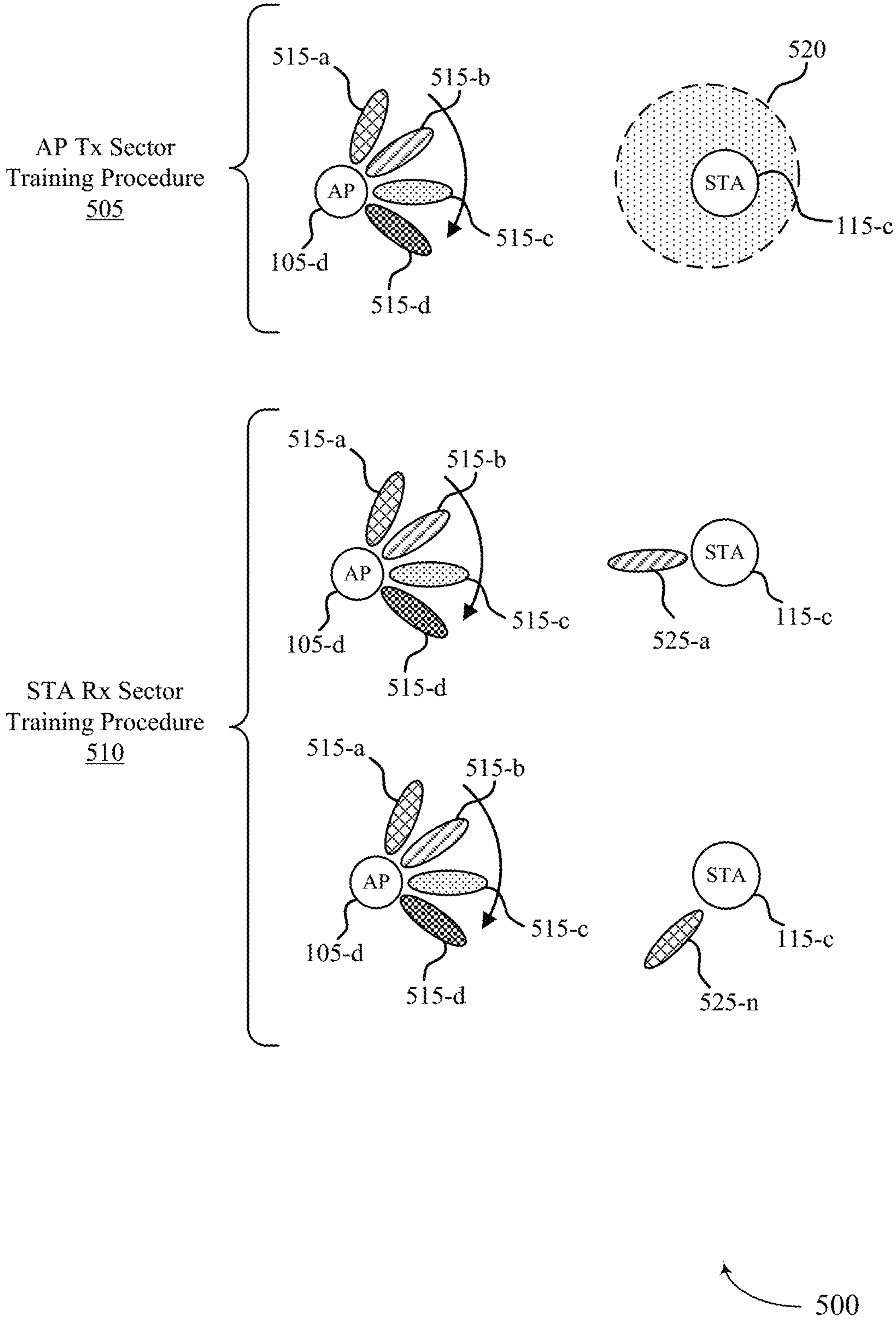
FIG. 5 illustrates an example of a passive beamforming procedure that supports passive beamforming for Wi-Fi in accordance with one or more aspects of the present disclosure.

FIG. 5 illustrates an example of a passive beamforming procedure 500 that supports passive beamforming for Wi-Fi in accordance with one or more aspects of the present disclosure. Aspects of the passive beamforming procedure 500 may implement, or be implemented by, aspects of the WLAN 100 and the wireless communications system 200. For example, the passive beamforming procedure 500 illustrates communication between an AP 105-*d* and a STA 115-*c*, which may be examples of the AP 105 and STA 115, respectively, as described herein. In some examples, the passive beamforming procedure 500 may be performed by a non-AP STA 115, such as a Wi-Fi-Direct device, that may be capable of transmitting beacons.

In the passive beamforming procedure 500, the STA 115-*c* may leverage the AP 105-*d* transmitted beacons on the 60 GHz band in lieu of performing the initiator sector sweep 315 of the beam training procedure 300. The STA 115-*c* may be an example of a non-DBS multi-band STA. When the STA 115-*c* is operating on a sub-6 GHz band and inactive on the 60 GHz band, the STA 115-*c* may use the passive beamforming procedure 500 to identify a Tx sector and an Rx sector for communications in the 60 GHz band. In some examples, the passive beamforming procedure 500 may include an AP Tx sector training 505 and a STA Rx sector training 510.

In the AP Tx sector training 505, while the AP 105-*d* and STA 115-*c* are active on a 2.4 GHz band, a 5 GHz band or a 6 GHz band, the AP 105-*d* may directionally transmit beacons in the 60 GHz band using the beacon transmitting procedure 400 illustrated in FIG. 4. In some examples, the AP 105-*d* may be a DBS capable AP that may transmit beacon in 60 GHz during normal operation in sub-6 GHz link with the STA 115-*c*. In some examples, the AP 105-*d* may be a DBS incapable AP that may tune to the 60 GHz band during a 60 GHz band TBTT to send the directional beacons.

In some examples, the AP 105-*d* may facilitate the passive beamforming procedure 500 by not allocating data or messages on the sub-6 GHz band to the STA 115-*c* during the 60 GHz band TBTT. In some examples, the AP 105-*d* may communicate the the 60 GHz band TBTT schedule to the STA 115-*c* via the sub-6 band, and the STA 115-*c* may monitor for the beacons in accordance with the scheduling information. In some examples, the AP 105-*d* and STA 115-*c* may send messages to trigger the passive beamforming procedure 500. For example, the STA 115-*c* may transmit a message to the AP 105-*d* on the sub-6 GHz band requesting the AP 105-*d* to pause incoming transmissions on the sub-6 GHz band, so the STA 115-*c* may perform the passive beamforming procedure 500. In response to the request, the AP 105-*d* may buffer any incoming traffic to the STA 115-*c* while the STA 115-*c* may perform the passive beamforming procedure 500. In some examples, the AP 105-*d* may transmit a message to the STA 115-*c* on the sub-6 GHz band indicating a pause in data transmissions, and the STA 115-*c* may perform the passive beamforming procedure. For example, the AP 105-*d* may determine that there are no allocations for the STA-115-*c*, and the AP 105-*d* may transmit a message to the STA 115-*c* on the sub-6 GHz band indicating that the STA 115-*c* should perform the passive beamforming procedure 500.

In the AP Tx sector training 505, the AP 105-*d* may sweep across multiple directional Tx sectors at TBTT and may transmit beacons from a subset of Tx sectors every beacon internal. The AP 105-*d* may deliver a beacon to every Tx sector at least once every "MaxLostBeacons" beacon interval. Each beacon may include unique markers per Tx sector. For the example illustrated in FIG. 5, the AP 105-*d* may directionally transmit beacons 515-*a*, 515-*b*, 515-*c* and 515-*d* on the 60 GHz band. In some examples, the AP 105-*d* may indicate to the STA 115-*c* the "MaxLostBeacons" beacon interval via MAC signaling on the active session on the sub-6 band.

In the AP Tx sector training 505, the STA 115-*c* may operate in a quasi-omnidirectional receiving mode for "MaxLostBeacons" beacon intervals to determine the Tx sector for the AP. For the example illustrated in FIG. 5, the STA 115-*c* may have an Rx beam 520 that is quasi-omnidirectional to receive the transmitted beacons 515-*a*, 515-*b*, 515-*c* and 515-*d*. The STA 115-*c* may select a Tx sector based on signal measurements of the received beacons at the STA 115-*c*. For example, the selected Tx sector corresponds to the beacon 515-*c*. In some examples, if the STA 115-*c* cannot receive any AP beacons, the STA 115-*c* may abandon the passive beamforming procedure 500 and may trigger link recovery procedures.

In the STA Rx sector training 510, to select an Rx sector for communications in the 60 GHz band, the STA 115-*c* may tune each Rx sector for a "MaxLostBeacons" beacon interval to receive beacons from the Tx sector. For the illustrated example in FIG. 5, the STA 115-*c* receives the beacon 515-*c* from the selected Tx sector on Rx sector 525-*a*, and the STA 115-*c* receives the beacon 515-*c* from the selected Tx sector on Rx sector 525-*n*, and so on for each STA Rx sector (e.g., Rx Sector 525-*a* . . . through Rx sector 525-*n*). The STA 115-*c* may identify the STA selected Rx sector based on signal measurements for the beacons from selected Tx sector. At the end of "Number of STA Rx Sectors*MaxLostBeacons" beacon intervals", the STA 115-*c* has selected the Tx sector and the Rx sector. Accordingly, a typical passive beamforming duration may be (Number of STA Rx Sectors+1) *"MaxLostBeacons"*BeaconInterval. In some examples, the STA 115-*c* may choose to iterate through a subset of Rx sectors based on previous beamforming results.

The STA 115-*c* may provide feedback to the AP 105-*d* of the Tx sector for the AP 105-*d*. The feedback may be provided on the active sub-6 GHz link via On Channel Tunneling (OCT) or another procedure or another message. In some examples, the feedback may be on the 60 GHz link either immediately or before start of data transfer on the 60 GHz link using the STA selected Rx sector assuming Tx/Rx reciprocity. For further communication on the 60 GHz link with the AP 105-*d*, the STA 115-*c* may use the STA selected Rx sector for both transmissions by the STA 115-*c* and receiving signals from the AP 105-*d*, assuming Tx/Rx reciprocity. For further communication on the 60 GHz link with the STA 115-*c*, the AP 105-*d* may use the selected Tx sector for both transmissions by the AP 105-*d* and receiving signals from the STA 115-*c*, assuming Tx/Rx reciprocity. After completion of the passive beamforming, BRP or full beamforming may be used for further tuning of Tx/Rx sectors and AWV.

In some examples, the passive beamforming procedure 500 may be used for link maintenance, channel estimation or as periodic beamforming to enable quick session transfer from sub-6 bands to 60 GHz band via MLO or similar techniques. The passive beamforming may not be a complete substitute for full beamforming as full beamforming may be required during normal data sessions on 60 GHz band (e.g., during the active session state). The passive beamforming procedure may be relevant when the AP 105-*d* is DBS capable and the STA 115-*c* is not DBS capable.

Figure 6:
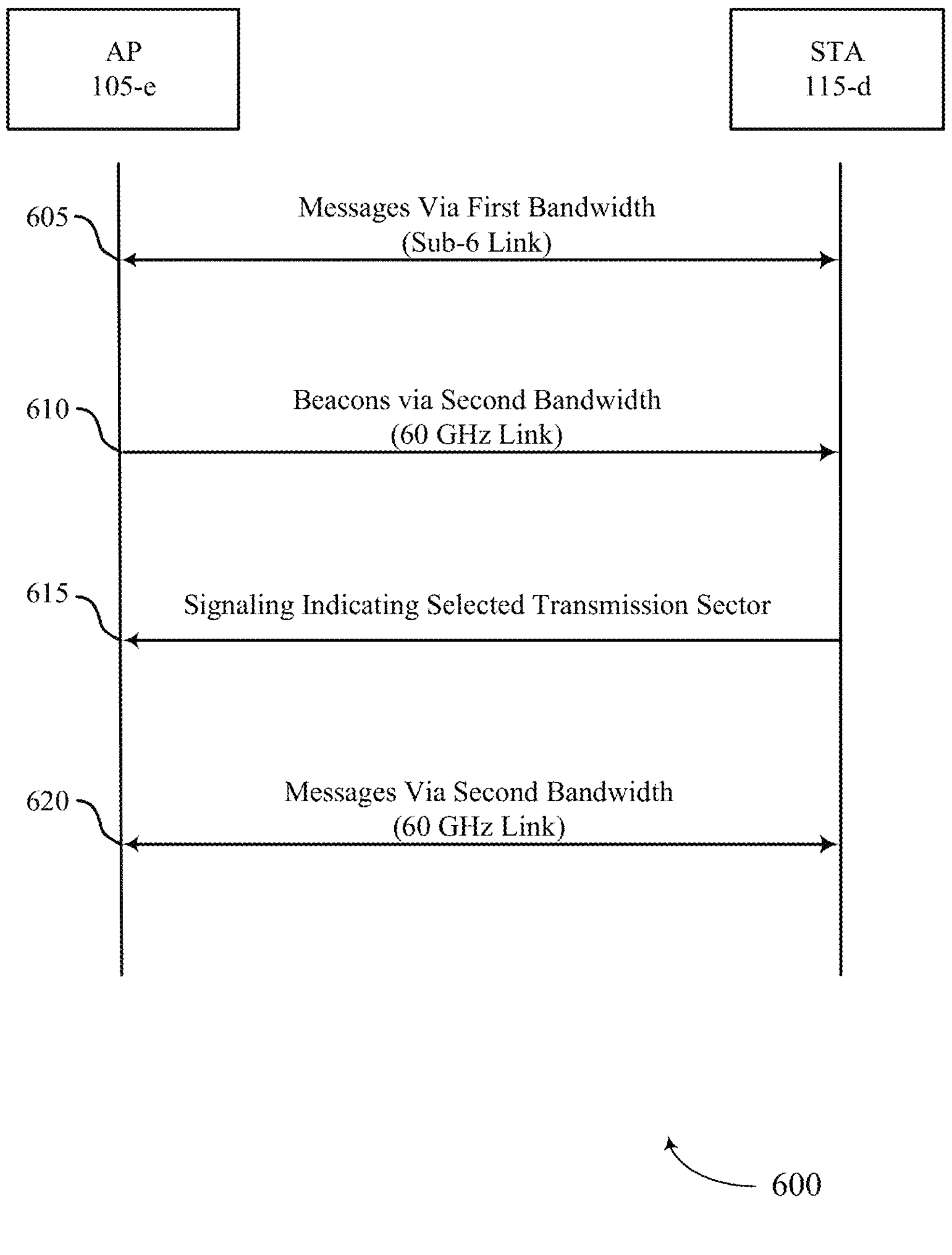
FIG. 6 illustrates an example of a process flow that supports passive beamforming for Wi-Fi in accordance with one or more aspects of the present disclosure.

FIG. 6 illustrates an example of a process flow 600 that supports passive beamforming for Wi-Fi in accordance with one or more aspects of the present disclosure. The process flow may include an AP 105-*e* and a STA 115-*d*, which may be examples of an AP 105 and a STA 115 as described herein. In the following description of the process flow 600, the operations between the AP 105-*e* and a STA 115-*d* may be transmitted in a different order than the example order shown, or the operations performed by the AP 105-*e* and a STA 115-*d* may be performed in different orders or at different times. Some operations may also be omitted from the process flow 600, and other operations may be added to the process flow 600. In some examples, the STA 115-*d* may be a first wireless device, and the AP 105-*e* may be a second wireless device. In some examples, rather than an AP, the second wireless device may be another STA capable of transmitting beacons, such as a Wi-Fi direct device.

At 605, the AP 105-*e* and the STA 115-*d* may communicate messages via a first session via a first bandwidth. The AP 105-*e* and the STA 115-*d* may be in an inactive session state for a second bandwidth. In some examples, the first bandwidth may be a sub-6 GHz bandwidth, and the second bandwidth may be a 60 GHz bandwidth.

At 610, the STA 115-*d* may receive, from the AP 105-*e* via the second bandwidth while operating in the inactive session state, beacons corresponding to Tx sectors of the AP 105-*e* for the second bandwidth.

At 615, the STA 115-*d* may transmit, to the AP 105-*e*, information indicating a selected Tx sector for the second bandwidth based on measurement information of the beacons.

In some examples, at 620, the STA 115-*d* may communicate with the AP 105-*e* via the second bandwidth using the selected Tx sector. For example, at 620, the STA 115-*d* may receive a message from the AP 105-*e* via the selected Tx sector.

In some examples, the STA 115-*d* may determine a selected Rx sector from a set of multiple of Rx sectors for the second bandwidth, and at 620 the STA 115-*d* may receive messages from the AP 105-*e* using the selected Rx sector and may transmit messages to the AP 105-*e* using a Tx sector that corresponds to the selected Rx sector (e.g., assuming TX/RX reciprocity).

In some examples, the STA 115-*d* may transmit, to the AP 105-*e*, information indicating the selected Tx sector for the second bandwidth via the first bandwidth or via the second bandwidth.

In some examples, each beacon may include a respective marker identifying a corresponding Tx sector.

In some examples, the STA 115-*d* may receive, from the AP 105-*e*, scheduling information for the beacons, and the STA 115-*d* may monitor for the beacons in accordance with the scheduling information. In some examples, the scheduling information indicates a refrain from data communications for the first wireless device on the first bandwidth during a time period corresponding to the plurality of beacons. For example, the AP 105-*e* may facilitate the STA 115-*d* to monitor beacons on the 60 GHz band per the scheduling information by not scheduling transmissions for the STA 115-*d* during a time period corresponding to the scheduled beacons.

In some examples, the AP 105-*e* may refrain from transmitting data transmissions to the STA 115-*d* via the first bandwidth during a beacon interval corresponding to a transmission of the beacons.

In some examples, the STA 115-*d* may receive, from the AP 105-*e* via the first bandwidth, a message indicating a pause in data transmissions via the first bandwidth.

In some examples, the AP 105-*e* may receive, from the STA 115-*d* via the first bandwidth, a message indicating a request to pause data transmissions via the first bandwidth, and the AP 015-*e* may refrain from transmitting data transmissions via the first bandwidth during a beacon interval corresponding to transmission of the set of multiple beacons.

In some examples, the STA 115-*d* may transmit, to the AP 105-*e*, an indication that the STA 115-*d* will perform a passive beamforming procedure using the beacons. The STA may then receive the beacons at 610 and transmit the information indicating a selected Tx sector for the second bandwidth at 615. Based on the indication that the STA 115-*d* will perform a passive beamforming procedure using the beacons, the AP 105-*e* may refrain from transmitting data communications to the STA 115-*d* during a time period corresponding to the beacons.

In some examples, the STA 115-*d* may receive, from the AP 105-*e*, an indication to perform a passive beamforming procedure using the plurality of beacons, where reception of the plurality of beacons is based at least in part on the indication. The STA 115-*d* may receive the beacons at 610 and transmit the information indicating a selected Tx sector for the second bandwidth at 615 based on the indication to perform the passive beamforming procedure.

Figure 7:
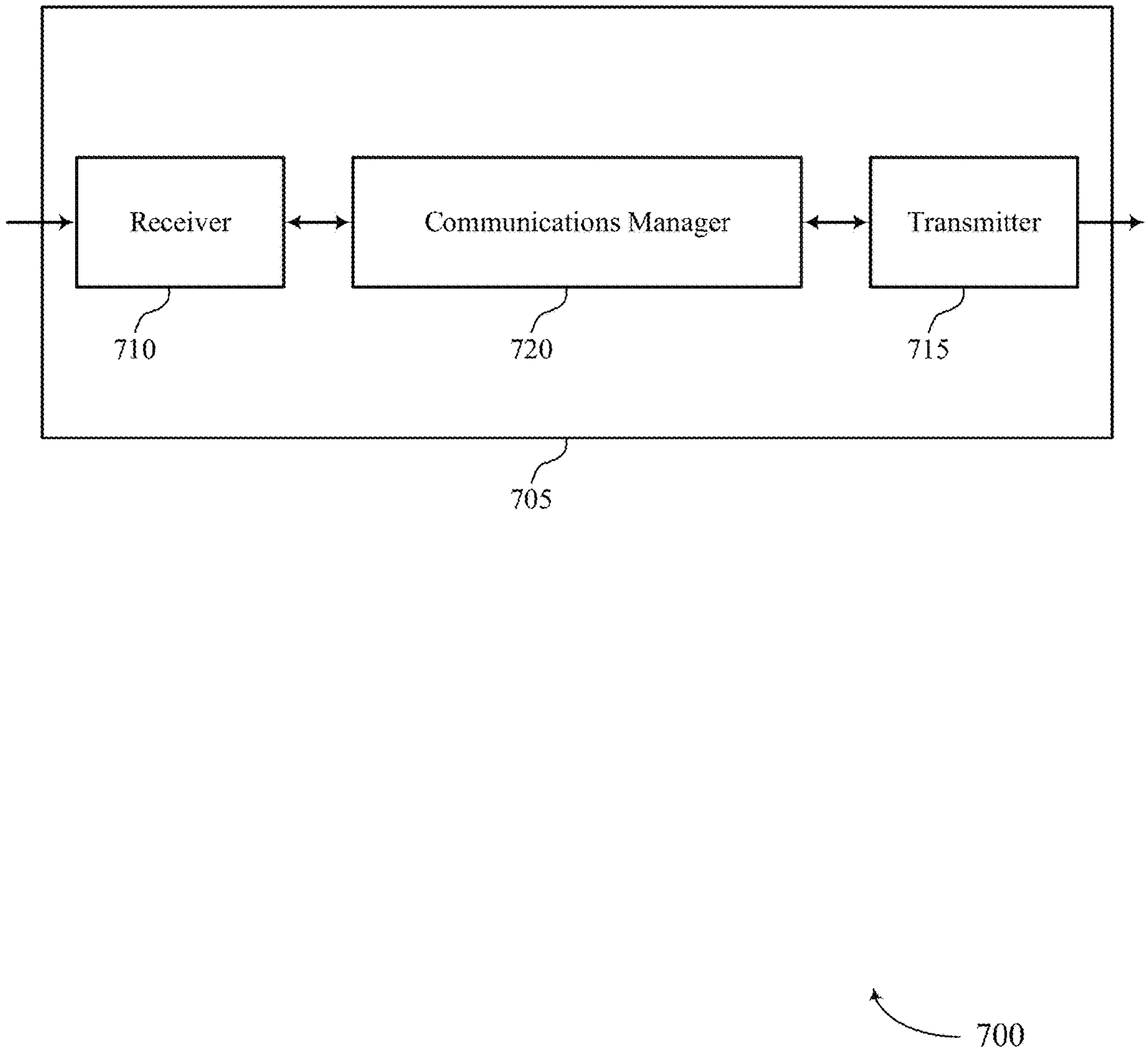
FIGS. 7 and 8 show block diagrams of devices that support passive beamforming for wi-fi in accordance with one or more aspects of the present disclosure.

FIG. 7 shows a block diagram 700 of a device 705 that supports passive beamforming for wi-fi in accordance with one or more aspects of the present disclosure. The device 705 may be an example of aspects of an STA as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to passive beamforming for wi-fi). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to passive beamforming for wi-fi). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of passive beamforming for wi-fi as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first wireless device in accordance with examples as disclosed herein. For example, the communications manager 720 may be configured as or otherwise support a means for communicating, with an second wireless device, one or more messages via a first session established between the first wireless device and the second wireless device via a first bandwidth, the first wireless device being in an inactive session state for a second bandwidth on which communication is supported by the second wireless device. The communications manager 720 may be configured as or otherwise support a means for receiving, from the second wireless device via the second bandwidth while operating in the inactive session state, a set of multiple beacons corresponding to a set of multiple transmission sectors of the second wireless device for the second bandwidth. The communications manager 720 may be configured as or otherwise support a means for transmitting, to the second wireless device, information indicating a selected transmission sector for the second bandwidth based on measurement information of the set of multiple beacons.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, more efficient utilization of communication resources.

Figure 8:
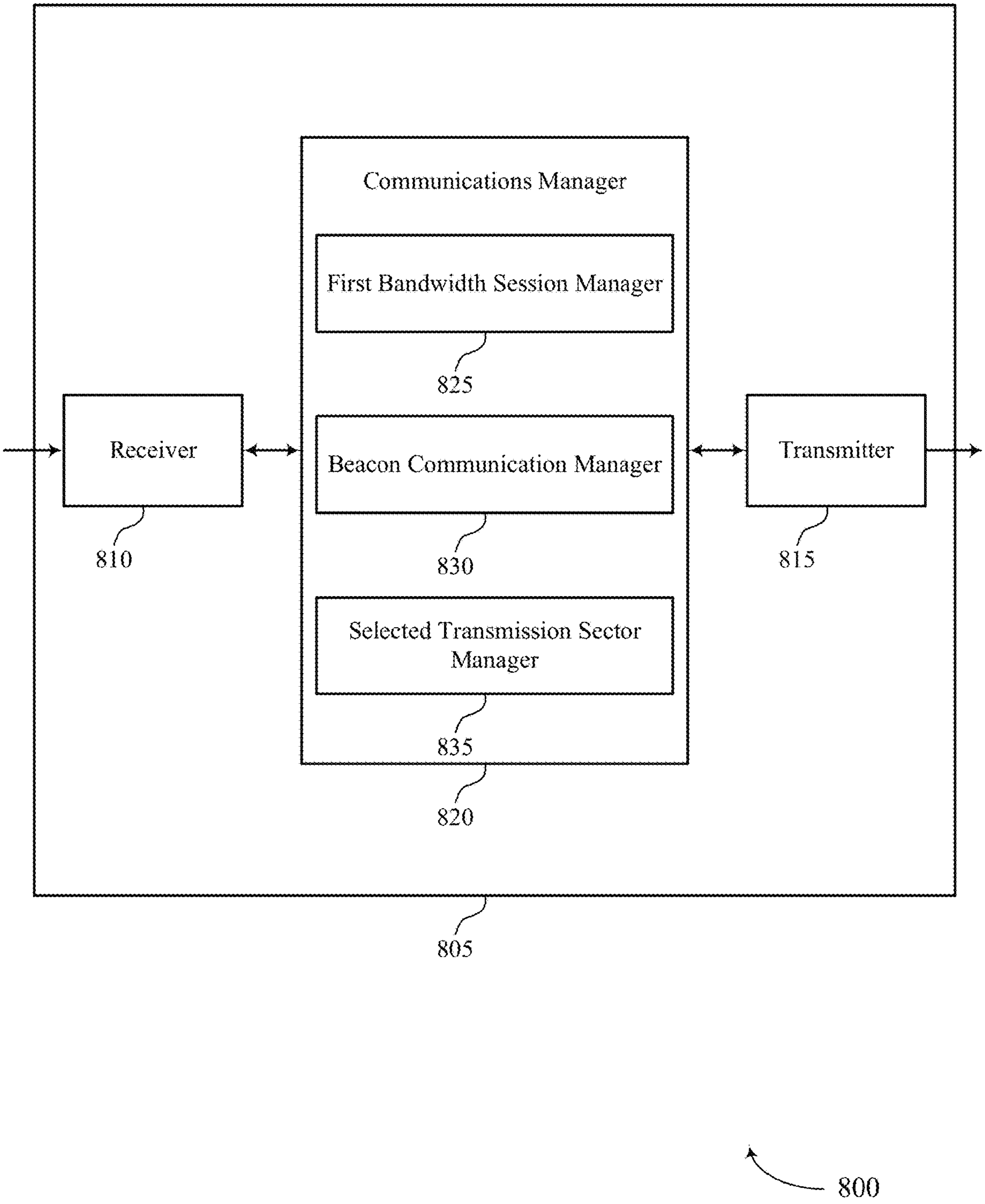

FIG. 8 shows a block diagram 800 of a device 805 that supports passive beamforming for wi-fi in accordance with one or more aspects of the present disclosure. The device 805 may be an example of aspects of a device 705 or an STA 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to passive beamforming for wi-fi). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to passive beamforming for wi-fi). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of passive beamforming for wi-fi as described herein. For example, the communications manager 820 may include a First Bandwidth Session Manager 825, a Beacon Communication Manager 830, a Selected Transmission Sector Manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first wireless device in accordance with examples as disclosed herein. The First Bandwidth Session Manager 825 may be configured as or otherwise support a means for communicating, with an second wireless device, one or more messages via a first session established between the first wireless device and the second wireless device via a first bandwidth, the first wireless device being in an inactive session state for a second bandwidth on which communication is supported by the second wireless device. The Beacon Communication Manager 830 may be configured as or otherwise support a means for receiving, from the second wireless device via the second bandwidth while operating in the inactive session state, a set of multiple beacons corresponding to a set of multiple transmission sectors of the second wireless device for the second bandwidth. The Selected Transmission Sector Manager 835 may be configured as or otherwise support a means for transmitting, to the second wireless device, information indicating a selected transmission sector for the second bandwidth based on measurement information of the set of multiple beacons.

Figure 9:
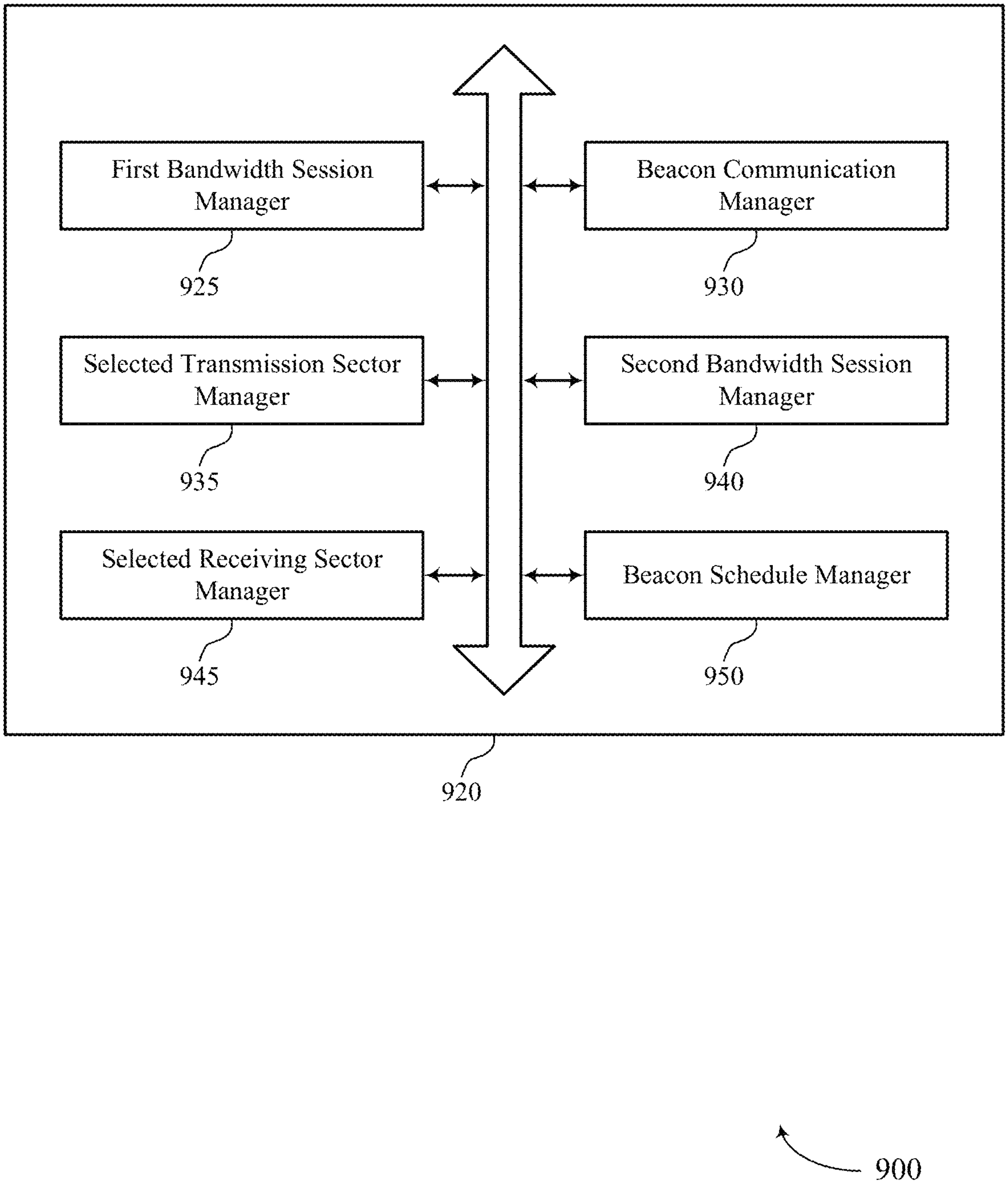
FIG. 9 shows a block diagram of a communications manager that supports passive beamforming for wi-fi in accordance with one or more aspects of the present disclosure.

FIG. 9 shows a block diagram 900 of a communications manager 920 that supports passive beamforming for wi-fi in accordance with one or more aspects of the present disclosure. The communications manager 920 may be an example of aspects of a communications manager 720, a communications manager 820, or both, as described herein. The communications manager 920, or various components thereof, may be an example of means for performing various aspects of passive beamforming for wi-fi as described herein. For example, the communications manager 920 may include a First Bandwidth Session Manager 925, a Beacon Communication Manager 930, a Selected Transmission Sector Manager 935, a Second Bandwidth Session Manager 940, a Selected Receiving Sector Manager 945, a Beacon Schedule Manager 950, or any combination thereof. Each of these components may communicate, directly or indirectly, with one another (e.g., via one or more buses).

The communications manager 920 may support wireless communications at a first wireless device in accordance with examples as disclosed herein. The First Bandwidth Session Manager 925 may be configured as or otherwise support a means for communicating, with an second wireless device, one or more messages via a first session established between the first wireless device and the second wireless device via a first bandwidth, the first wireless device being in an inactive session state for a second bandwidth on which communication is supported by the second wireless device. The Beacon Communication Manager 930 may be configured as or otherwise support a means for receiving, from the second wireless device via the second bandwidth while operating in the inactive session state, a set of multiple beacons corresponding to a set of multiple transmission sectors of the second wireless device for the second bandwidth. The Selected Transmission Sector Manager 935 may be configured as or otherwise support a means for transmitting, to the second wireless device, information indicating a selected transmission sector for the second bandwidth based on measurement information of the set of multiple beacons.

In some examples, the Second Bandwidth Session Manager 940 may be configured as or otherwise support a means for receiving a message from the second wireless device via the second bandwidth via the selected transmission sector.

In some examples, the Selected Receiving Sector Manager 945 may be configured as or otherwise support a means for determining a selected receive sector for the first wireless device for the second bandwidth from a set of multiple receive sectors based on the set of multiple beacons. In some examples, the Second Bandwidth Session Manager 940 may be configured as or otherwise support a means for receiving a message from the second wireless device via the second bandwidth using the selected receive sector.

In some examples, the Second Bandwidth Session Manager 940 may be configured as or otherwise support a means for transmitting a second message to the second wireless device via the second bandwidth using a transmission sector for the first wireless device that corresponds to the selected receive sector (e.g., assuming TX/RX reciprocity).

In some examples, to support transmitting the information, the Second Bandwidth Session Manager 940 may be configured as or otherwise support a means for transmitting the information via the second bandwidth.

In some examples, to support transmitting the information, the First Bandwidth Session Manager 925 may be configured as or otherwise support a means for transmitting the information via the first bandwidth.

In some examples, each beacon of the set of multiple beacons includes a respective marker identifying a corresponding transmission sector.

In some examples, the Beacon Schedule Manager 950 may be configured as or otherwise support a means for receiving, from the second wireless device, scheduling information for the set of multiple beacons, where receiving the set of multiple beacons is based on monitoring for the set of multiple beacons in accordance with the scheduling information.

In some examples, the scheduling information indicates a refrain from data communications for the first wireless device on the first bandwidth during a time period corresponding to the set of multiple beacons.

In some examples, the first bandwidth includes a sub-6 GHz bandwidth.

In some examples, the second bandwidth includes a 60 GHz bandwidth.

In some examples, the second wireless device includes an AP.

In some examples, the Beacon Communication Manager 930 may be configured as or otherwise support a means for transmitting, to the second wireless device, an indication that the first wireless device will perform a passive beamforming procedure using the set of multiple beacons.

In some examples, the Beacon Communication Manager 930 may be configured as or otherwise support a means for receive, from second wireless device, an indication to perform a passive beamforming procedure using the set of multiple beacons, where reception of the set of multiple beacons is based on the indication.

Figure 10:
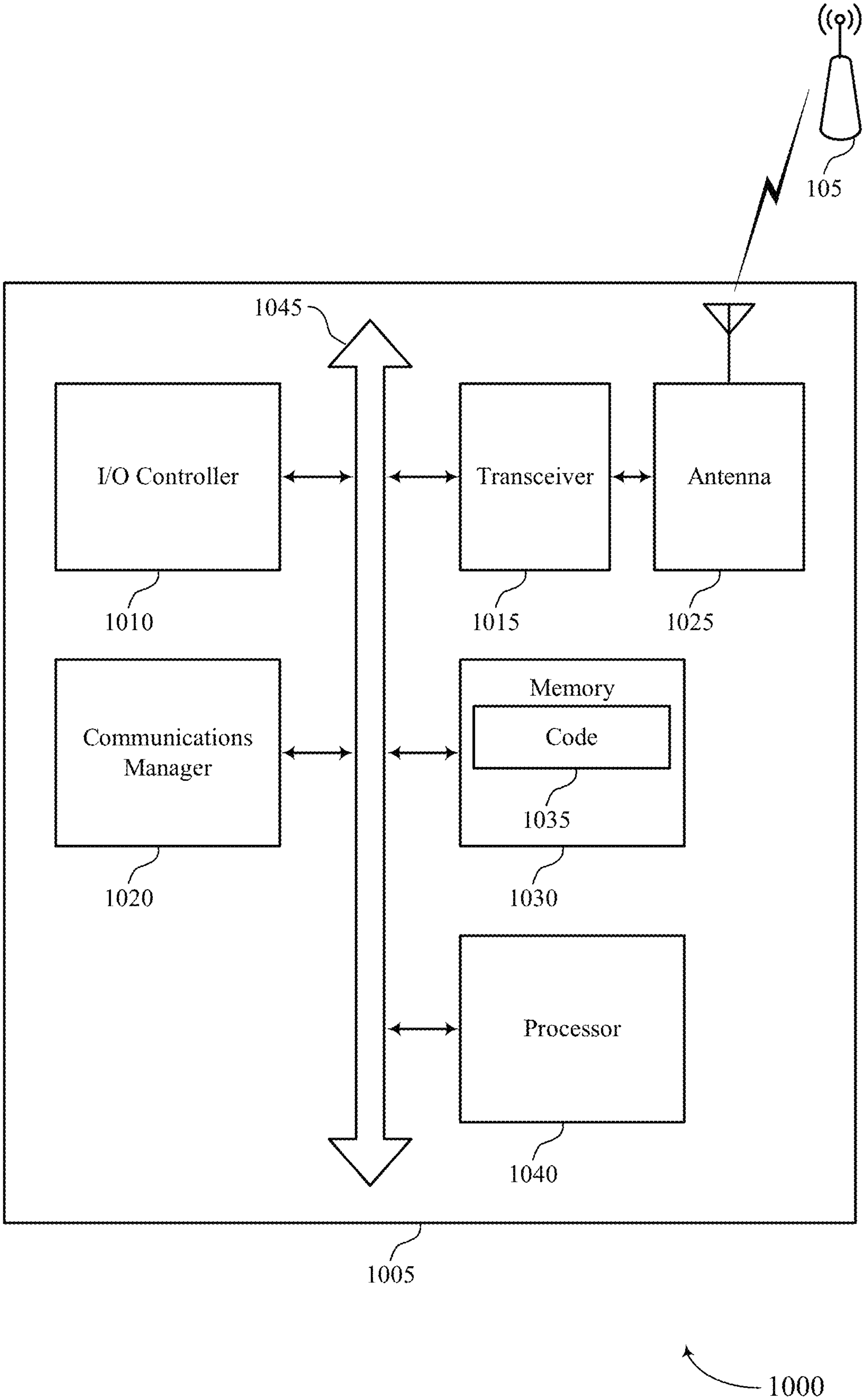
FIG. 10 shows a diagram of a system including a device that supports passive beamforming for wi-fi in accordance with one or more aspects of the present disclosure.

FIG. 10 shows a diagram of a system 1000 including a device 1005 that supports passive beamforming for wi-fi in accordance with one or more aspects of the present disclosure. The device 1005 may be an example of or include the components of a device 705, a device 805, or an STA as described herein. The device 1005 may include components for bi-directional voice and data communications including components for transmitting and receiving communications, such as a communications manager 1020, an I/O controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In some other cases, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets and provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting passive beamforming for wi-fi). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a first wireless device in accordance with examples as disclosed herein. For example, the communications manager 1020 may be configured as or otherwise support a means for communicating, with an second wireless device, one or more messages via a first session established between the first wireless device and the second wireless device via a first bandwidth, the first wireless device being in an inactive session state for a second bandwidth on which communication is supported by the second wireless device. The communications manager 1020 may be configured as or otherwise support a means for receiving, from the second wireless device via the second bandwidth while operating in the inactive session state, a set of multiple beacons corresponding to a set of multiple transmission sectors of the second wireless device for the second bandwidth. The communications manager 1020 may be configured as or otherwise support a means for transmitting, to the second wireless device, information indicating a selected transmission sector for the second bandwidth based on measurement information of the set of multiple beacons.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability.

Figure 11:
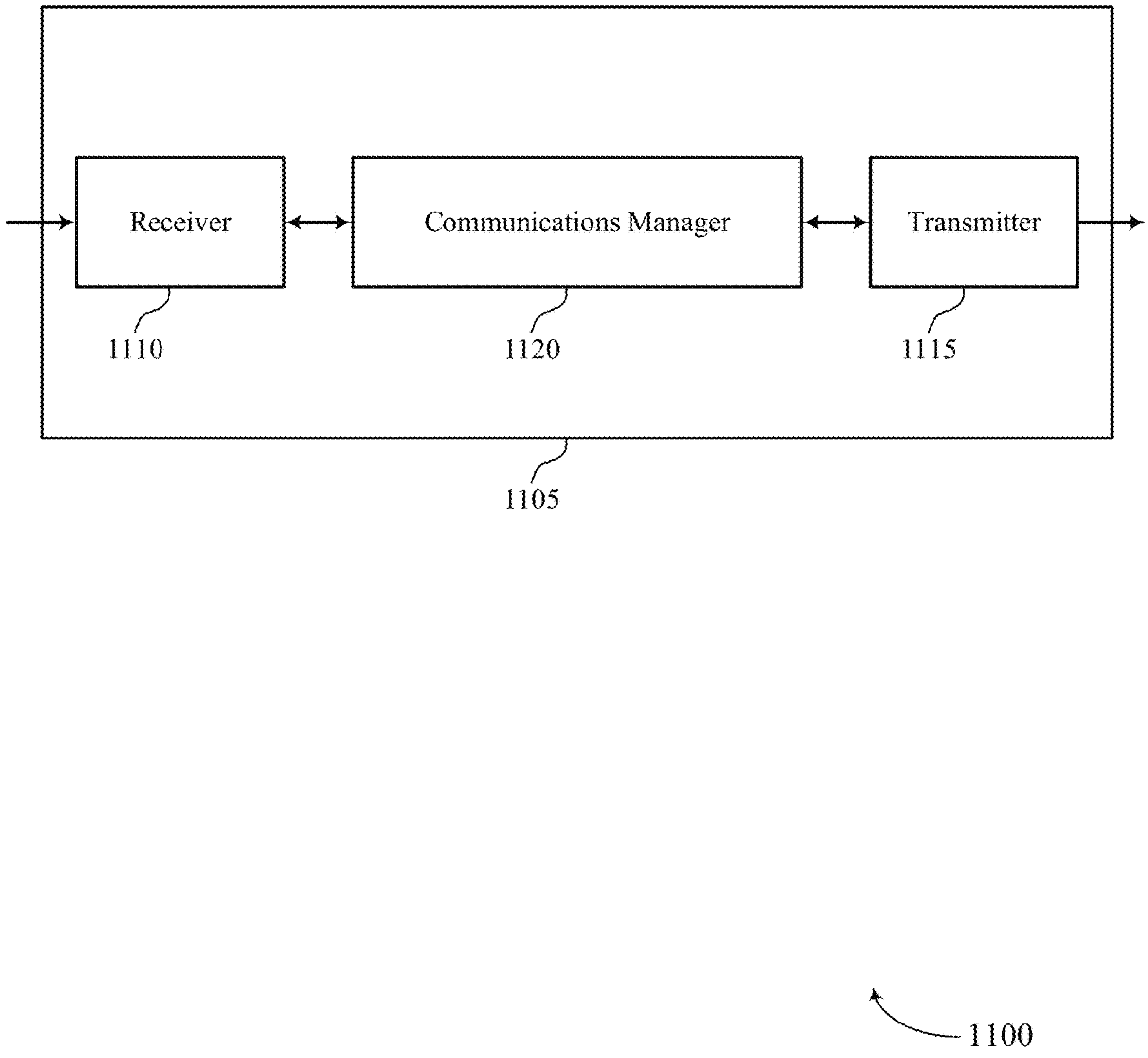
FIGS. 11 and 12 show block diagrams of devices that support passive beamforming for wi-fi in accordance with one or more aspects of the present disclosure.

FIG. 11 shows a block diagram 1100 of a device 1105 that supports passive beamforming for wi-fi in accordance with one or more aspects of the present disclosure. The device 1105 may be an example of aspects of an AP as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to passive beamforming for wi-fi). Information may be passed on to other components of the device 1105. The receiver 1110 may utilize a single antenna or a set of multiple antennas.

The transmitter 1115 may provide a means for transmitting signals generated by other components of the device 1105. The transmitter 1115 may utilize a single antenna or a set of multiple antennas.

The communications manager 1120, the receiver 1110, the transmitter 1115, or various combinations thereof or various components thereof may be examples of means for performing various aspects of passive beamforming for wi-fi as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a second wireless device in accordance with examples as disclosed herein. For example, the communications manager 1120 may be configured as or otherwise support a means for communicating, with a first wireless device, one or more messages via a first session established between the first wireless device and the second wireless device via a first bandwidth, the first wireless device being in an inactive session state for a second bandwidth on which communication is supported by the second wireless device. The communications manager 1120 may be configured as or otherwise support a means for transmitting, via the second bandwidth while the first wireless device is in the inactive session state, a set of multiple beacons corresponding to a set of multiple transmission sectors of the second wireless device. The communications manager 1120 may be configured as or otherwise support a means for receiving, from the first wireless device, information indicating a selected transmission sector for the second bandwidth.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, more efficient utilization of communication resources.

Figure 12:
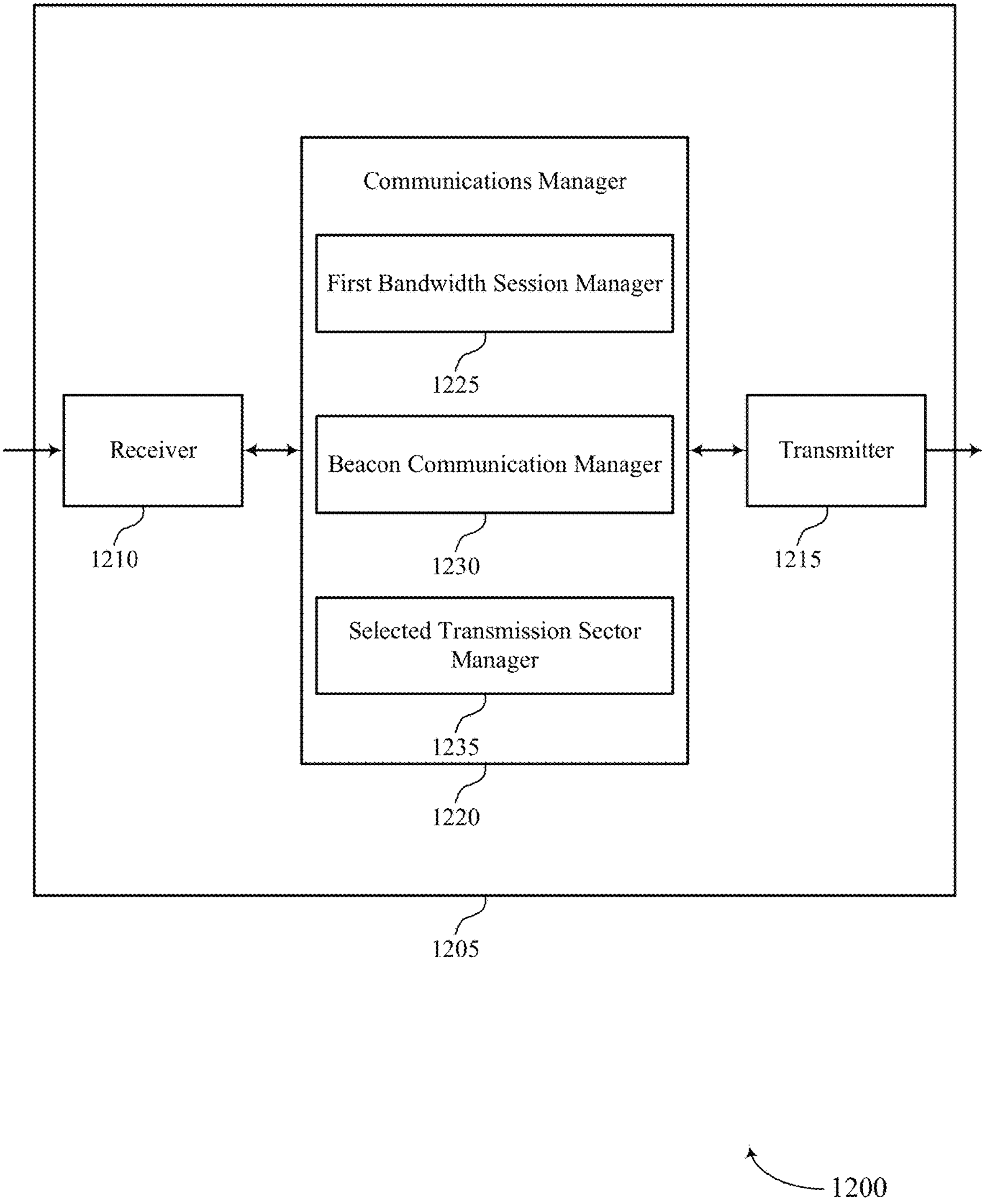

FIG. 12 shows a block diagram 1200 of a device 1205 that supports passive beamforming for wi-fi in accordance with one or more aspects of the present disclosure. The device 1205 may be an example of aspects of a device 1105 or an AP 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to passive beamforming for wi-fi). Information may be passed on to other components of the device 1205. The receiver 1210 may utilize a single antenna or a set of multiple antennas.

The transmitter 1215 may provide a means for transmitting signals generated by other components of the device 1205. The transmitter 1215 may utilize a single antenna or a set of multiple antennas.

The device 1205, or various components thereof, may be an example of means for performing various aspects of passive beamforming for wi-fi as described herein. For example, the communications manager 1220 may include a First Bandwidth Session Manager 1225, a Beacon Communication Manager 1230, a Selected Transmission Sector Manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a second wireless device in accordance with examples as disclosed herein. The First Bandwidth Session Manager 1225 may be configured as or otherwise support a means for communicating, with a first wireless device, one or more messages via a first session established between the first wireless device and the second wireless device via a first bandwidth, the first wireless device being in an inactive session state for a second bandwidth on which communication is supported by the second wireless device. The Beacon Communication Manager 1230 may be configured as or otherwise support a means for transmitting, via the second bandwidth while the first wireless device is in the inactive session state, a set of multiple beacons corresponding to a set of multiple transmission sectors of the second wireless device. The Selected Transmission Sector Manager 1235 may be configured as or otherwise support a means for receiving, from the first wireless device, information indicating a selected transmission sector for the second bandwidth.

Figure 13:
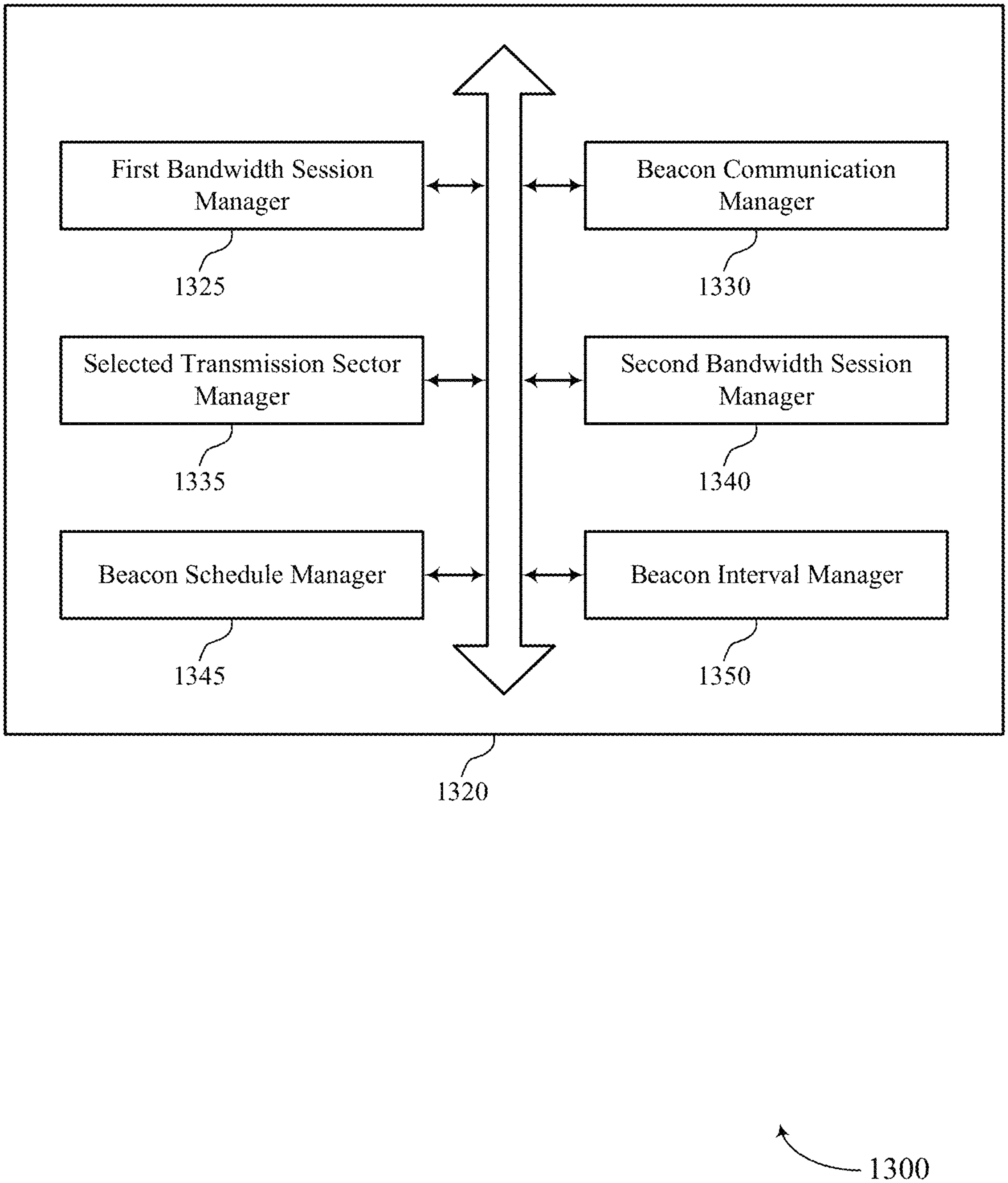
FIG. 13 shows a block diagram of a communications manager that supports passive beamforming for wi-fi in accordance with one or more aspects of the present disclosure.

FIG. 13 shows a block diagram 1300 of a communications manager 1320 that supports passive beamforming for wi-fi in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of passive beamforming for wi-fi as described herein. For example, the communications manager 1320 may include a First Bandwidth Session Manager 1325, a Beacon Communication Manager 1330, a Selected Transmission Sector Manager 1335, a Second Bandwidth Session Manager 1340, a Beacon Schedule Manager 1345, a Beacon Interval Manager 1350, or any combination thereof. Each of these components may communicate, directly or indirectly, with one another (e.g., via one or more buses).

The communications manager 1320 may support wireless communications at a second wireless device in accordance with examples as disclosed herein. The First Bandwidth Session Manager 1325 may be configured as or otherwise support a means for communicating, with a first wireless device, one or more messages via a first session established between the first wireless device and the second wireless device via a first bandwidth, the first wireless device being in an inactive session state for a second bandwidth on which communication is supported by the second wireless device. The Beacon Communication Manager 1330 may be configured as or otherwise support a means for transmitting, via the second bandwidth while the first wireless device is in the inactive session state, a set of multiple beacons corresponding to a set of multiple transmission sectors of the second wireless device. The Selected Transmission Sector Manager 1335 may be configured as or otherwise support a means for receiving, from the first wireless device, information indicating a selected transmission sector for the second bandwidth.

In some examples, the Second Bandwidth Session Manager 1340 may be configured as or otherwise support a means for transmitting, to the first wireless device, a message via the second bandwidth via the selected transmission sector.

In some examples, each beacon of the set of multiple beacons includes a respective marker identifying a corresponding transmission sector.

In some examples, the Beacon Schedule Manager 1345 may be configured as or otherwise support a means for transmitting, to the first wireless device, scheduling information for the set of multiple beacons.

In some examples, the scheduling information indicates a refrain from data communications for the first wireless device on the first bandwidth during a time period corresponding to the set of multiple beacons.

In some examples, the first bandwidth includes a sub-6 GHz bandwidth.

In some examples, the second bandwidth includes a 60 GHz bandwidth.

In some examples, to support receiving the information, the Second Bandwidth Session Manager 1340 may be configured as or otherwise support a means for receiving the information via the second bandwidth.

In some examples, to support receiving the information, the First Bandwidth Session Manager 1325 may be configured as or otherwise support a means for receiving the information via the first bandwidth.

In some examples, the second wireless device includes an AP.

In some examples, the Beacon Interval Manager 1350 may be configured as or otherwise support a means for refraining from transmitting data transmissions via the first bandwidth during a beacon interval corresponding to transmission of the set of multiple beacons.

In some examples, the Beacon Communication Manager 1330 may be configured as or otherwise support a means for receiving, from the first wireless device, an indication that the first wireless device will perform a passive beamforming procedure using the set of multiple beacons. In some examples, the First Bandwidth Session Manager 1325 may be configured as or otherwise support a means for refraining from transmitting data communications to the first wireless device during a time period corresponding to the set of multiple beacons based on the indication.

In some examples, the Beacon Communication Manager 1330 may be configured as or otherwise support a means for transmitting, to the second wireless device, an indication to perform a passive beamforming procedure using the set of multiple beacons.

Figure 14:
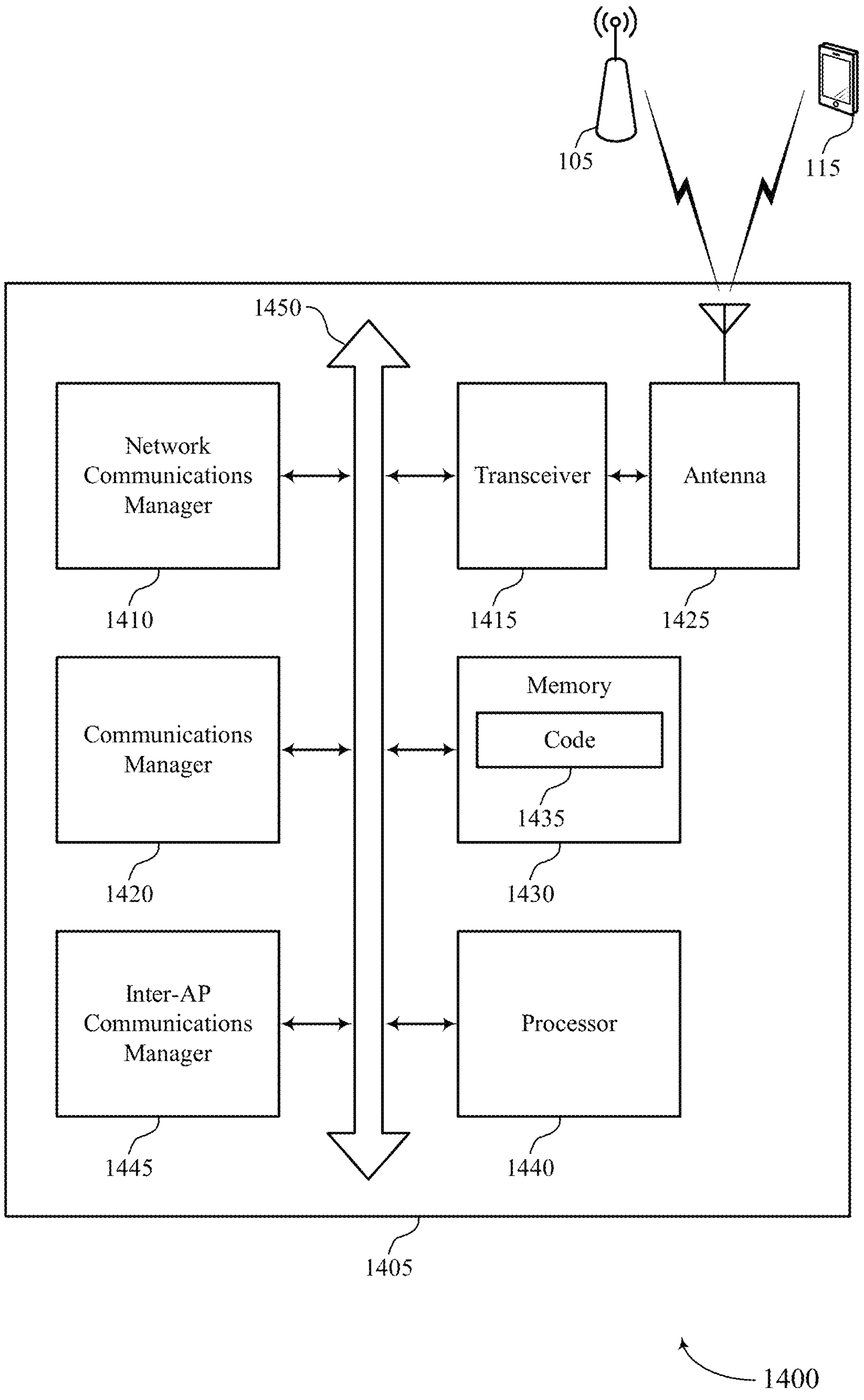
FIG. 14 shows a diagram of a system including a device that supports passive beamforming for wi-fi in accordance with one or more aspects of the present disclosure.

FIG. 14 shows a diagram of a system 1400 including a device 1405 that supports passive beamforming for wi-fi in accordance with one or more aspects of the present disclosure. The device 1405 may be an example of or include the components of a device 1105, a device 1205, or an AP as described herein. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-AP communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network (e.g., via one or more wired backhaul links). For example, the network communications manager 1410 may manage the transfer of data communications for client devices, such as one or more STAs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets and provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting passive beamforming for wi-fi). For example, the device 1405 or a component of the device 1405 may include a processor 1440 and memory 1430 coupled with or to the processor 1440, the processor 1440 and memory 1430 configured to perform various functions described herein.

The inter-station communications manager 1445 may manage communications with other APs 105, and may include a controller or scheduler for controlling communications with STAs 115 in cooperation with other APs 105. For example, the inter-station communications manager 1445 may coordinate scheduling for transmissions to APs 105 for various interference mitigation techniques such as beamforming or joint transmission. In some examples, the inter-station communications manager 1445 may provide an X2 interface within an LTE/LTE-A wireless communication network technology to provide communication between APs 105.

The communications manager 1420 may support wireless communications at a second wireless device in accordance with examples as disclosed herein. For example, the communications manager 1420 may be configured as or otherwise support a means for communicating, with a first wireless device, one or more messages via a first session established between the first wireless device and the second wireless device via a first bandwidth, the first wireless device being in an inactive session state for a second bandwidth on which communication is supported by the second wireless device. The communications manager 1420 may be configured as or otherwise support a means for transmitting, via the second bandwidth while the first wireless device is in the inactive session state, a set of multiple beacons corresponding to a set of multiple transmission sectors of the second wireless device. The communications manager 1420 may be configured as or otherwise support a means for receiving, from the first wireless device, information indicating a selected transmission sector for the second bandwidth.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability.

Figure 15:
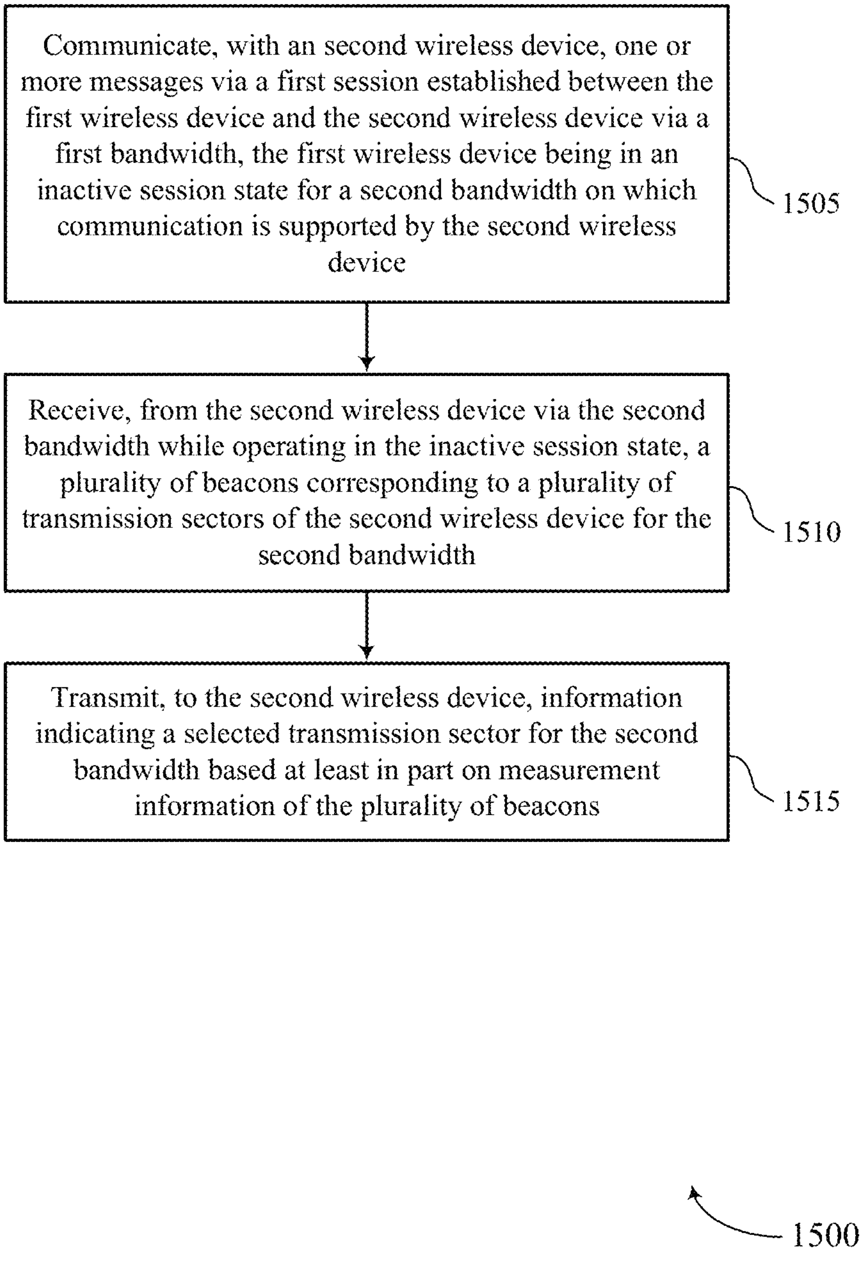
FIGS. 15 through 17 show flowcharts illustrating methods that support passive beamforming for wi-fi in accordance with one or more aspects of the present disclosure.

FIG. 15 shows a flowchart illustrating a method 1500 that supports passive beamforming for wi-fi in accordance with one or more aspects of the present disclosure. The operations of the method 1500 may be implemented by an STA or its components as described herein. For example, the operations of the method 1500 may be performed by an STA as described with reference to FIGs. FIG. 1 through 10. In some examples, an STA may execute a set of instructions to control the functional elements of the STA to perform the described functions. Additionally, or alternatively, the STA may perform aspects of the described functions using special-purpose hardware.

At 1505, the method may include communicating, with an second wireless device, one or more messages via a first session established between the first wireless device and the second wireless device via a first bandwidth, the first wireless device being in an inactive session state for a second bandwidth on which communication is supported by the second wireless device. The operations of 1505 may be performed in accordance with examples as disclosed herein. In some examples, aspects of the operations of 1505 may be performed by a First Bandwidth Session Manager 925 as described with reference to FIG. 9.

At 1510, the method may include receiving, from the second wireless device via the second bandwidth while operating in the inactive session state, a set of multiple beacons corresponding to a set of multiple transmission sectors of the second wireless device for the second bandwidth. The operations of 1510 may be performed in accordance with examples as disclosed herein. In some examples, aspects of the operations of 1510 may be performed by a Beacon Communication Manager 930 as described with reference to FIG. 9.

At 1515, the method may include transmitting, to the second wireless device, information indicating a selected transmission sector for the second bandwidth based on measurement information of the set of multiple beacons. The operations of 1515 may be performed in accordance with examples as disclosed herein. In some examples, aspects of the operations of 1515 may be performed by a Selected Transmission Sector Manager 935 as described with reference to FIG. 9.

Figure 16:
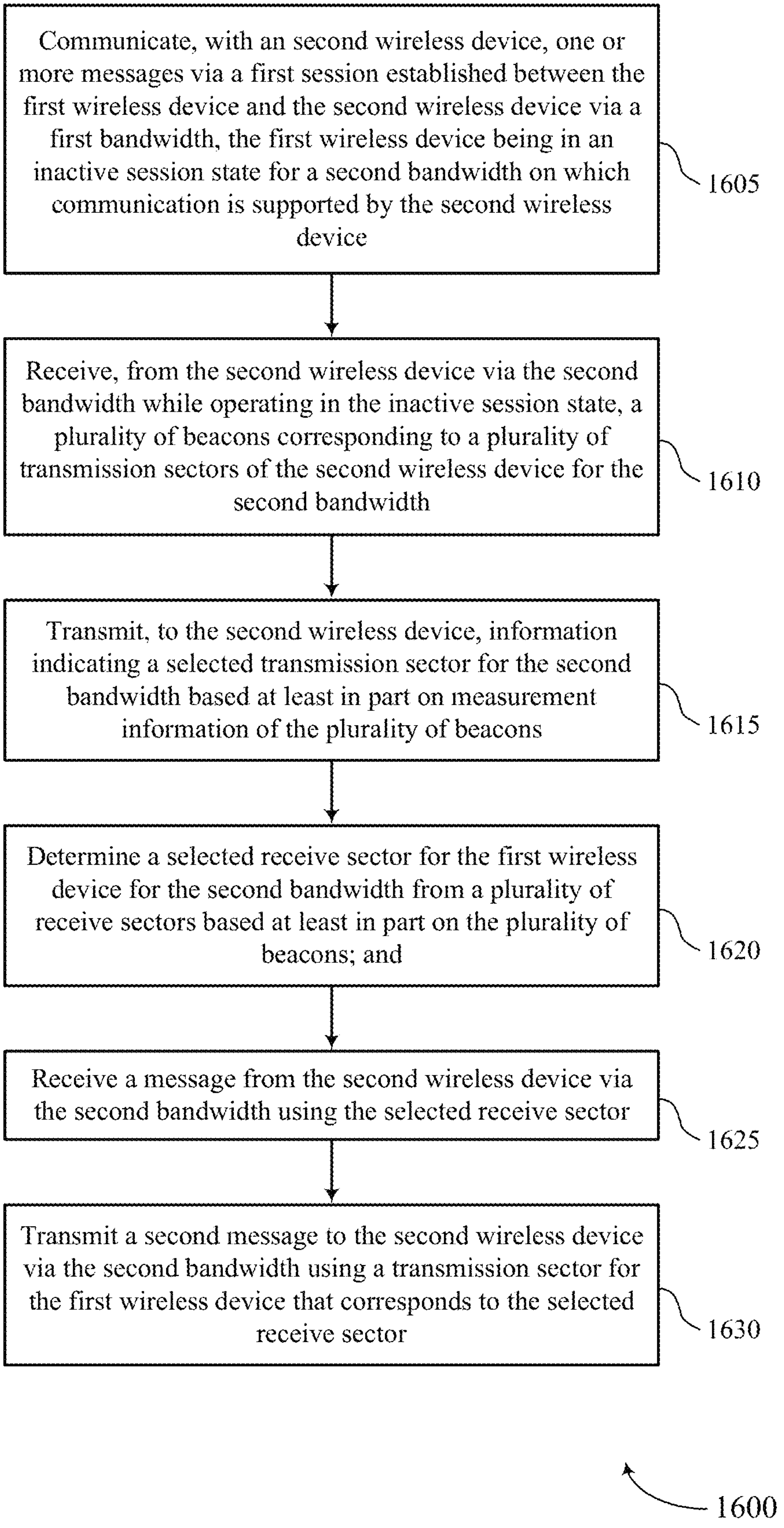

FIG. 16 shows a flowchart illustrating a method 1600 that supports passive beamforming for wi-fi in accordance with one or more aspects of the present disclosure. The operations of the method 1600 may be implemented by an STA or its components as described herein. For example, the operations of the method 1600 may be performed by an STA as described with reference to FIGs. FIG. 1 through 10. In some examples, an STA may execute a set of instructions to control the functional elements of the STA to perform the described functions. Additionally, or alternatively, the STA may perform aspects of the described functions using special-purpose hardware.

At 1605, the method may include communicating, with an second wireless device, one or more messages via a first session established between the first wireless device and the second wireless device via a first bandwidth, the first wireless device being in an inactive session state for a second bandwidth on which communication is supported by the second wireless device. The operations of 1605 may be performed in accordance with examples as disclosed herein. In some examples, aspects of the operations of 1605 may be performed by a First Bandwidth Session Manager 925 as described with reference to FIG. 9.

At 1610, the method may include receiving, from the second wireless device via the second bandwidth while operating in the inactive session state, a set of multiple beacons corresponding to a set of multiple transmission sectors of the second wireless device for the second bandwidth. The operations of 1610 may be performed in accordance with examples as disclosed herein. In some examples, aspects of the operations of 1610 may be performed by a Beacon Communication Manager 930 as described with reference to FIG. 9.

At 1615, the method may include transmitting, to the second wireless device, information indicating a selected transmission sector for the second bandwidth based on measurement information of the set of multiple beacons. The operations of 1615 may be performed in accordance with examples as disclosed herein. In some examples, aspects of the operations of 1615 may be performed by a Selected Transmission Sector Manager 935 as described with reference to FIG. 9.

At 1620, the method may include determining a selected receive sector for the first wireless device for the second bandwidth from a set of multiple receive sectors based on the set of multiple beacons; and. The operations of 1620 may be performed in accordance with examples as disclosed herein. In some examples, aspects of the operations of 1620 may be performed by a Selected Receiving Sector Manager 945 as described with reference to FIG. 9.

At 1625, the method may include receiving a message from the second wireless device via the second bandwidth using the selected receive sector. The operations of 1625 may be performed in accordance with examples as disclosed herein. In some examples, aspects of the operations of 1625 may be performed by a Second Bandwidth Session Manager 940 as described with reference to FIG. 9.

At 1630, assuming Tx/Rx reciprocity, the method may include transmitting a second message to the second wireless device via the second bandwidth using a transmission sector for the first wireless device that corresponds to the selected receive sector (e.g., assuming Tx/Rx reciprocity). The operations of 1630 may be performed in accordance with examples as disclosed herein. In some examples, aspects of the operations of 1630 may be performed by a Second Bandwidth Session Manager 940 as described with reference to FIG. 9.

Figure 17:
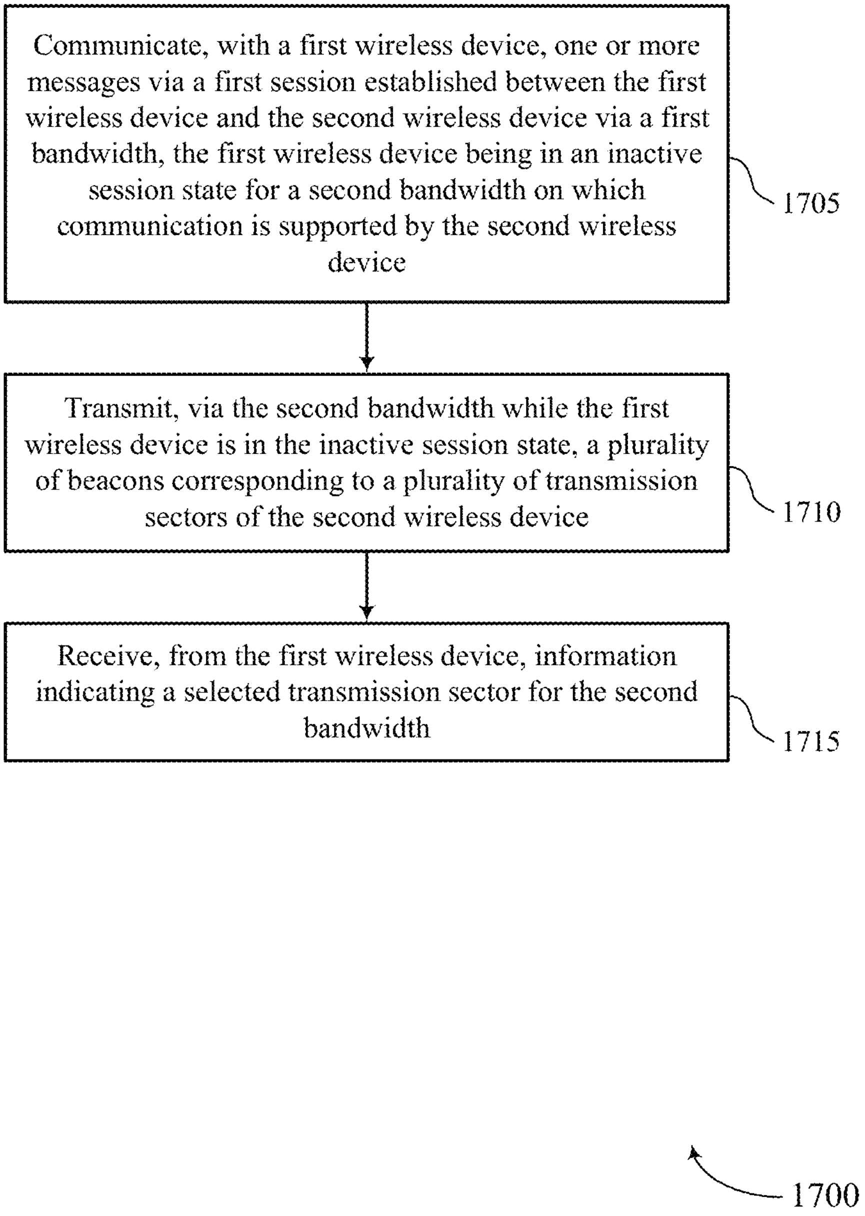

FIG. 17 shows a flowchart illustrating a method 1700 that supports passive beamforming for wi-fi in accordance with one or more aspects of the present disclosure. The operations of the method 1700 may be implemented by an AP or its components as described herein. For example, the operations of the method 1700 may be performed by an AP as described with reference to FIGS. 1 through 6 and 11 through 14. In some examples, an AP may execute a set of instructions to control the functional elements of the AP to perform the described functions. Additionally, or alternatively, the AP may perform aspects of the described functions using special-purpose hardware.

At 1705, the method may include communicating, with a first wireless device, one or more messages via a first session established between the first wireless device and the second wireless device via a first bandwidth, the first wireless device being in an inactive session state for a second bandwidth on which communication is supported by the second wireless device. The operations of 1705 may be performed in accordance with examples as disclosed herein. In some examples, aspects of the operations of 1705 may be performed by a First Bandwidth Session Manager 1325 as described with reference to FIG. 13.

At 1710, the method may include transmitting, via the second bandwidth while the first wireless device is in the inactive session state, a set of multiple beacons corresponding to a set of multiple transmission sectors of the second wireless device. The operations of 1710 may be performed in accordance with examples as disclosed herein. In some examples, aspects of the operations of 1710 may be performed by a Beacon Communication Manager 1330 as described with reference to FIG. 13.

At 1715, the method may include receiving, from the first wireless device, information indicating a selected transmission sector for the second bandwidth. The operations of 1715 may be performed in accordance with examples as disclosed herein. In some examples, aspects of the operations of 1715 may be performed by a Selected Transmission Sector Manager 1335 as described with reference to FIG. 13.

The following provides an overview of aspects of the present disclosure:

Aspect 1: A method for wireless communications at a first wireless device, comprising: communicating, with an second wireless device, one or more messages via a first session established between the first wireless device and the second wireless device via a first bandwidth, the first wireless device being in an inactive session state for a second bandwidth on which communication is supported by the second wireless device; receiving, from the second wireless device via the second bandwidth while operating in the inactive session state, a plurality of beacons corresponding to a plurality of transmission sectors of the second wireless device for the second bandwidth; and transmitting, to the second wireless device, information indicating a selected transmission sector for the second bandwidth based at least in part on measurement information of the plurality of beacons.

Aspect 2: The method of aspect 1, further comprising: receiving a message from the second wireless device via the second bandwidth via the selected transmission sector.

Aspect 3: The method of any of aspects 1 through 2, further comprising: determining a selected receive sector for the first wireless device for the second bandwidth from a plurality of receive sectors based at least in part on the plurality of beacons; and receiving a message from the second wireless device via the second bandwidth using the selected receive sector.

Aspect 4: The method of aspect 3, further comprising: transmitting a second message to the second wireless device via the second bandwidth using a transmission sector for the first wireless device that corresponds to the selected receive sector.

Aspect 5: The method of any of aspects 1 through 4, wherein transmitting the information comprises: transmitting the information via the second bandwidth.

Aspect 6: The method of any of aspects 1 through 5, wherein transmitting the information comprises: transmitting the information via the first bandwidth.

Aspect 7: The method of any of aspects 1 through 6, wherein each beacon of the plurality of beacons includes a respective marker identifying a corresponding transmission sector.

Aspect 8: The method of any of aspects 1 through 7, further comprising: receiving, from the second wireless device, scheduling information for the plurality of beacons, wherein receiving the plurality of beacons is based at least in part on monitoring for the plurality of beacons in accordance with the scheduling information.

Aspect 9: The method of aspect 8, wherein the scheduling information indicates a refrain from data communications for the first wireless device on the first bandwidth during a time period corresponding to the plurality of beacons.

Aspect 10: The method of any of aspects 1 through 9, wherein the first bandwidth comprises a sub-6 GHz bandwidth.

Aspect 11: The method of any of aspects 1 through 10, wherein the second bandwidth comprises a 60 GHz bandwidth.

Aspect 12: The method of any of aspects 1 through 11, wherein the second wireless device comprises an AP.

Aspect 13: The method of any of aspects 1 through 12, further comprising: transmitting, to the second wireless device, an indication that the first wireless device will perform a passive beamforming procedure using the plurality of beacons.

Aspect 14: The method of any of aspects 1 through 13, further comprising: receive, from second wireless device, an indication to perform a passive beamforming procedure using the plurality of beacons, wherein reception of the plurality of beacons is based at least in part on the indication.

Aspect 15: A method for wireless communications at a second wireless device, comprising: communicating, with a first wireless device, one or more messages via a first session established between the first wireless device and the second wireless device via a first bandwidth, the first wireless device being in an inactive session state for a second bandwidth on which communication is supported by the second wireless device; transmitting, via the second bandwidth while the first wireless device is in the inactive session state, a plurality of beacons corresponding to a plurality of transmission sectors of the second wireless device; and receiving, from the first wireless device, information indicating a selected transmission sector for the second bandwidth.

Aspect 16: The method of aspect 15, further comprising: transmitting, to the first wireless device, a message via the second bandwidth via the selected transmission sector.

Aspect 17: The method of any of aspects 15 through 16, wherein each beacon of the plurality of beacons includes a respective marker identifying a corresponding transmission sector.

Aspect 18: The method of any of aspects 15 through 17, further comprising: transmitting, to the first wireless device, scheduling information for the plurality of beacons, wherein receiving the plurality of beacons is based at least in part on monitoring for the plurality of beacons in accordance with the scheduling information.

Aspect 19: The method of aspect 18, wherein the scheduling information indicates a refrain from data communications for the first wireless device on the first bandwidth during a time period corresponding to the plurality of beacons.

Aspect 20: The method of any of aspects 15 through 19, wherein the first bandwidth comprises a sub-6 GHz bandwidth.

Aspect 21: The method of any of aspects 15 through 20, wherein the second bandwidth comprises a 60 GHz bandwidth.

Aspect 22: The method of any of aspects 15 through 21, wherein receiving the information comprises: receiving the information via the second bandwidth.

Aspect 23: The method of any of aspects 15 through 22, wherein receiving the information comprises: receiving the information via the first bandwidth.

Aspect 24: The method of any of aspects 15 through 23, wherein the second wireless device comprises an AP.

Aspect 25: The method of any of aspects 15 through 24, further comprising: refraining from transmitting data transmissions via the first bandwidth during a beacon interval corresponding to transmission of the plurality of beacons.

Aspect 26: The method of any of aspects 15 through 25, further comprising: receiving, from the first wireless device, an indication that the first wireless device will perform a passive beamforming procedure using the plurality of beacons; and refraining from transmitting data communications to the first wireless device during a time period corresponding to the plurality of beacons based at least in part on the indication.

Aspect 27: The method of any of aspects 15 through 26, further comprising: transmitting, to the second wireless device, an indication to perform a passive beamforming procedure using the plurality of beacons Aspect 28: An apparatus for wireless communications at a first wireless device, comprising a processor; memory coupled with the processor; and instructions stored in the memory and executable by the processor to cause the apparatus to perform a method of any of aspects 1 through 14.

Aspect 29: An apparatus for wireless communications at a first wireless device, comprising at least one means for performing a method of any of aspects 1 through 14.

Aspect 30: A non-transitory computer-readable medium storing code for wireless communications at a first wireless device, the code comprising instructions executable by a processor to perform a method of any of aspects 1 through 14.

Aspect 31: An apparatus for wireless communications at a second wireless device, comprising a processor; memory coupled with the processor; and instructions stored in the memory and executable by the processor to cause the apparatus to perform a method of any of aspects 15 through 27.

Aspect 32: An apparatus for wireless communications at a second wireless device, comprising at least one means for performing a method of any of aspects 15 through 27.

Aspect 33: A non-transitory computer-readable medium storing code for wireless communications at a second wireless device, the code comprising instructions executable by a processor to perform a method of any of aspects 15 through 27.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and wireless communications system 200—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first wireless device, comprising:

one or more processors;

memory coupled with the one or more processors; and instructions stored in the memory and executable by the one or more processors to cause the apparatus to:

communicate, with a second wireless device via a second bandwidth while operating in an inactive session state for the second bandwidth and while operating in an active session state with the second wireless device for a first bandwidth, a plurality of beacons corresponding to a plurality of transmission sectors of the second wireless device for the second bandwidth; and communicate, with the second wireless device, information indicating a selected transmission sector for the second bandwidth based at least in part on communication of the plurality of beacons.

2. The apparatus of claim 1, wherein the instructions are further executable by the one or more processors to cause the apparatus to:

communicate, with the second wireless device, one or more messages via the first bandwidth while operating in the active session state.

3. The apparatus of claim 1, wherein the instructions to communicate the plurality of beacons are further executable by the one or more processors to cause the apparatus to:

receive the plurality of beacons, wherein the selected transmission sector is based at least in part on measurement information of the plurality of beacons.

4. The apparatus of claim 3, wherein the instructions are further executable by the one or more processors to cause the apparatus to:

receive a message from the second wireless device via the second bandwidth via the selected transmission sector.

5. The apparatus of claim 3, wherein the instructions are further executable by the one or more processors to cause the apparatus to:

determine a selected receive sector for the first wireless device for the second bandwidth from a plurality of receive sectors based at least in part on the plurality of beacons; and receive a message from the second wireless device via the second bandwidth using the selected receive sector.

6. The apparatus of claim 5, wherein the instructions are further executable by the one or more processors to cause the apparatus to:

transmit a second message to the second wireless device via the second bandwidth using a transmission sector for the first wireless device that corresponds to the selected receive sector.

7. The apparatus of claim 3, wherein the instructions are further executable by the one or more processors to cause the apparatus to:

receive, from the second wireless device, an indication to perform a passive beamforming procedure using the plurality of beacons, wherein reception of the plurality of beacons is based at least in part on the indication.

8. The apparatus of claim 1, wherein the instructions are further executable by the one or more processors to cause the apparatus to:

transmit, to the second wireless device, an indication that the first wireless device will perform a passive beamforming procedure using the plurality of beacons.

9. The apparatus of claim 1, wherein the instructions are further executable by the one or more processors to cause the apparatus to:

receive, from the second wireless device, an indication that the second wireless device will perform a passive beamforming procedure using the plurality of beacons; and refrain from communication of data with the first wireless device during a time period corresponding to the plurality of beacons based at least in part on the indication.

10. The apparatus of claim 1, wherein the instructions to communicate the information are executable by the one or more processors to cause the apparatus to:

communicate the information via the second bandwidth.

11. The apparatus of claim 1, wherein the instructions to communicate the information are executable by the one or more processors to cause the apparatus to:

communicate the information via the first bandwidth.

12. The apparatus of claim 1, wherein each beacon of the plurality of beacons includes a respective marker identifying a corresponding transmission sector.

13. The apparatus of claim 1, wherein the instructions are further executable by the one or more processors to cause the apparatus to:

transmit, to the second wireless device, a message via the second bandwidth via the selected transmission sector, wherein the instructions to communicate the plurality of beacons are further executable by the one or more processors to cause the apparatus to transmit the plurality of beacons.

14. The apparatus of claim 13, wherein the instructions are further executable by the one or more processors to cause the apparatus to:

refrain from transmitting data to the second wireless device via the first bandwidth during a beacon interval corresponding to transmission of the plurality of beacons.

15. The apparatus of claim 13, wherein the first wireless device comprises an access point.

16. The apparatus of claim 1, wherein the instructions are further executable by the one or more processors to cause the apparatus to:

communicate, with the second wireless device, scheduling information for the plurality of beacons, wherein communication of the plurality of beacons is based at least in part on the scheduling information.

17. The apparatus of claim 16, wherein the scheduling information indicates a refrain from data communications for the first wireless device on the first bandwidth during a time period corresponding to the plurality of beacons.

18. The apparatus of claim 1, wherein:

the first bandwidth comprises a sub-6 GHz bandwidth; and the second bandwidth comprises a 60 GHz bandwidth.

19. A method for wireless communications at a first wireless device, comprising:

communicating, with a second wireless device via a second bandwidth while operating in an inactive session state for the second bandwidth and while operating in an active session state with the second wireless device for a first bandwidth, a plurality of beacons corresponding to a plurality of transmission sectors of the second wireless device for the second bandwidth; and communicating, with the second wireless device, information indicating a selected transmission sector for the second bandwidth based at least in part on communication of the plurality of beacons.

20. A non-transitory computer-readable medium storing code for wireless communications at a first wireless device, the code comprising instructions executable by one or more processors to:

communicate, with a second wireless device via a second bandwidth while operating in an inactive session state for the second bandwidth and while operating in an active session state with the second wireless device for a first bandwidth, a plurality of beacons corresponding to a plurality of transmission sectors of the second wireless device for the second bandwidth; and communicate, with the second wireless device, information indicating a selected transmission sector for the second bandwidth based at least in part on communication of the plurality of beacons.

* * * * *